United States Patent [19]

Matsumoto et al.

[11] Patent Number: 5,537,180
[45] Date of Patent: Jul. 16, 1996

[54] CAMERA FOR RECORDING POSITION INFORMATION OF OBJECT TO BE PHOTOGRAPHED ON THE BASIS OF MOVING AMOUNT OF OBJECT IN PHOTOGRAPHIC IMAGE PLANE, AND METHOD OF RECORDING POSITION INFORMATION

[75] Inventors: Hisayuki Matsumoto; Junichi Itoh, both of Tokyo, Japan

[73] Assignee: Olympus Optical Co., Ltd., Tokyo, Japan

[21] Appl. No.: 362,020

[22] Filed: Dec. 22, 1994

[30] Foreign Application Priority Data

May 27, 1994 [JP] Japan .................................. 6-115320

[51] Int. Cl.$^6$ .......................... G03B 7/08; G03B 13/36; G03B 17/24
[52] U.S. Cl. ..................... 354/402; 354/410; 354/106
[58] Field of Search ........................... 354/400, 402, 354/430, 105, 106, 202

[56] References Cited

U.S. PATENT DOCUMENTS 5,262,867  11/1993  Kojima .................. 354/105 X
5,289,227  2/1994  Kinjo ...................... 354/402
5,365,303  11/1994  Yamasaki et al. .......... 354/430

FOREIGN PATENT DOCUMENTS 3-51839   3/1991  Japan .
3-131840  6/1991  Japan .

*Primary Examiner*—W. B. Perkey
*Attorney, Agent, or Firm*—Frishauf, Holtz, Goodman, Langer & Chick

[57] ABSTRACT

A camera shake detecting unit detects and outputs an angular velocity applied to a camera. When the camera shake detecting unit detects the angular velocity applied to the camera, a camera rotational angle calculating unit calculates the rotational angle of the camera from focus lock to the ON operation of a 2RSW switch on the basis of an output from the camera shake detecting unit. A moving amount/principal object position calculating unit generates position information based on the moving amount of a principal object to be photographed in an image plane. The position information thus generated on the basis of the moving amount of the principal object in the image plane is recorded in a recording portion of a film.

17 Claims, 19 Drawing Sheets

CAMERA FOR RECORDING POSITION INFORMATION OF OBJECT TO BE PHOTOGRAPHED ON THE BASIS OF MOVING AMOUNT OF OBJECT IN PHOTOGRAPHIC IMAGE PLANE, AND METHOD OF RECORDING POSITION INFORMATION

BACKGROUND OF THE INVENTION

1. Field of the Invention

The present invention relates to a camera capable of recording information about the position of a principal object to be photographed present in a photographic image plane and, more particularly, to a camera capable of recording information about the position of a principal object to be photographed, which is required to perform proper exposure in printing after photography, and a method of recording the information.

2. Description of the Related Art

Recently, cameras which use a silver salt film in photography and record photographic information on the film have been developed. A film used in a camera of this type includes an information recording portion, such as a magnetic recording portion, for writing various information. A camera system which records position information of a principal object to be photographed present in a photographic image plane, as one information to be recorded, is also known.

For example, Jpn. Pat. Appln. KOKAI Publication No. 3-51839 discloses a camera which records information indicating whether a principal object to be photographed exists in the center of a photographic image plane. Also, Jpn. Pat. Appln. KOKAI Publication No. 3-131840 discloses a system in which position information and luminance information of a principal object to the photographed in a photographic image plane are recorded by using an AF (Automatic Focusing) technique based on multi-distance measurement during photography, and in printing after the photography, these pieces of information are read out to determine a printing exposure amount for mainly the principal object, thereby printing the picture.

In photographing a principal object to be photographed not present in the center of a photographic image plane, the general approach is as follows except in some gaze-sensing, automatic focusing cameras. That is, a user locks the focus with a principal object to be photographed present in a central focusing area (in which distance measurement for automatic focusing is performed) of a photographic image plane and then takes a picture after changing a field angle meeting the intended composition. In executing a photographing method of this type, it is useful to detect position information of a principal object after the field angle is changed and record this information, together with luminance information, in an information recording portion of a film, in order to apply the method to a system using the printing method described above.

Unfortunately, the position information obtained in conventional techniques is in many cases information simply indicating whether a principal object to be photographed is present in the center of a photographic image plane during focus lock. Also, AF by three-point distance measurement is the main stream in compact cameras using the multi-distance measurement AF. Consequently, the position information obtained by this technique is very coarse, and the information can be obtained only by an AF camera which performs the multi-distance measurement.

That is, in conventional techniques, no method is established which detects position information of a principal object to be photographed after a field angle is changed, i.e., the moving amount of the principal object in a photographic image plane. Therefore, no conventional techniques can be usefully applied to the system mentioned above.

SUMMARY OF THE INVENTION

It is, therefore, an object of the present invention to provide a novel camera which is improved to be able to easily and accurately detect position information of an object to be photographed in a photographic image plane, which is based on the moving amount of the object, and record the position information in an information recording portion of a photographic film, and to provide a method of recording the information.

According to one aspect of the present invention, there is provided a camera capable of loading a film having an information recording portion, comprising:

a) focusing means for measuring a distance to a principal object to be photographed present in a focusing area of a photographic image plane and determining a focal position of a taking lens on the basis of the measurement result; b) output means for determining a position of the principal object in the photographic image plane in response to a change in a photographic field angle after the focusing means has determined the focal position, and outputting principal object position information; and c) recording means for recording the principal object position information from the output means in the information recording portion of the film.

According to another aspect of the present invention, there is provided an information recording method of a camera having detecting means for detecting a rotational angle of the camera and recording means for recording information on a film, comprising the steps of: a) generating an operation start signal in response to a first operation performed by a user; b) starting an integral action for an output from the detecting means in response to the operation start signal; c) generating an operation end signal in response to a second operation performed by the user during the integral action; d) stopping the integral action in response to the operation end signal; e) converting a signal obtained by the integral action into recording information to be recorded on the film; and f) recording the recording information on the film.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Figure 1:
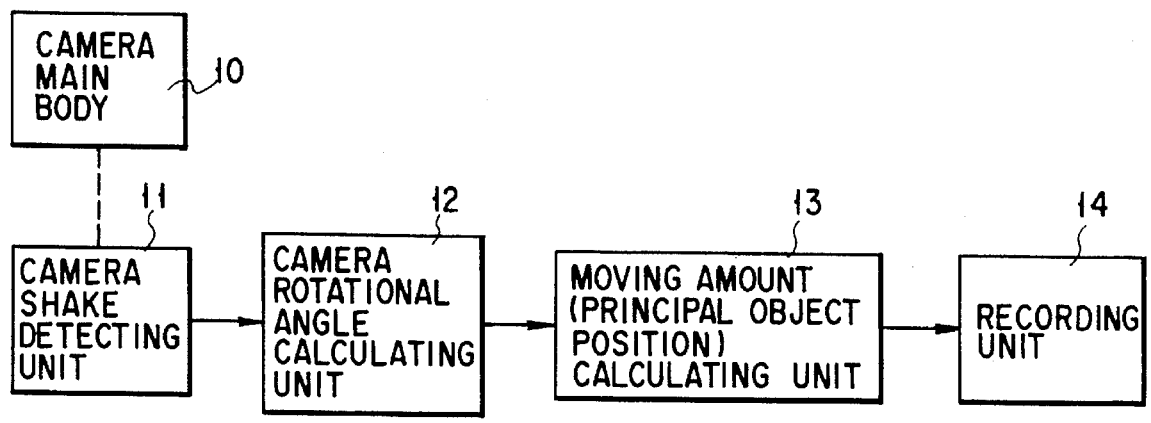
FIG. 1 is a block diagram showing the concept of the first embodiment of a camera of the present invention.

Reference will now be made in detail to the presently preferred embodiments of the invention as illustrated in the accompanying drawings, in which like reference characters designate like or corresponding parts throughout the several drawings.

The concept of the present invention will be described first.

In a recent few years, a number of techniques pertaining to antivibration cameras mounting a camera shake detecting circuit and a camera shake compensating circuit have been proposed, and some of them have been put into practical use. The most popular sensor as a camera shake detecting means for use in these antivibration cameras is an angular velocity sensor (vibration gyro). An angular velocity sensor senses an angular velocity applied to a camera and drives a taking lens in a direction in which the detected angular velocity (camera shake) is canceled, thereby performing antivibration. In addition, since the angular velocity integrated once yields an angle displacement signal, it is also possible to detect the tilt angle of a camera.

Consequently, it is possible to detect the moving amount of a principal object to be photographed in a photographic image plane from the tilt angle of a camera occurring after the focus is locked on the principal object and before a release button is depressed after a change of a field angle, and to calculate position information on the principal object in the photographic image plane from the detected moving amount. The present invention has focused attention on this fact. For example, by effectively using a camera shake detecting means, such as an angular velocity sensor, as a means for detecting the moving amount of a principal object to be photographed, position information based on the moving amount of a principal object to be photographed can be readily and accurately detected and recorded in an information recording portion of a film.

Embodiments of the present invention based on the above concept will be described below with reference to the accompanying drawings.

Note that a camera according to the present invention has a release button (not shown) of a two-stroke operation type. That is, the distance to an object to be photographed in a central focusing area of a photographic image is measured by a first release switch (1RSW) which is operated by a first stroke of the release button. The focus is kept locked while the 1RSW is depressed. When the release button is further depressed to a second release switch (2RSW) which is operated by a second stroke of the release button, a shutter is started. In the embodiments to be described below, it is assumed that a camera has a release button with this arrangement. Alternatively, a camera can have a focus-lock button separated from a release button.

Figure 2A:
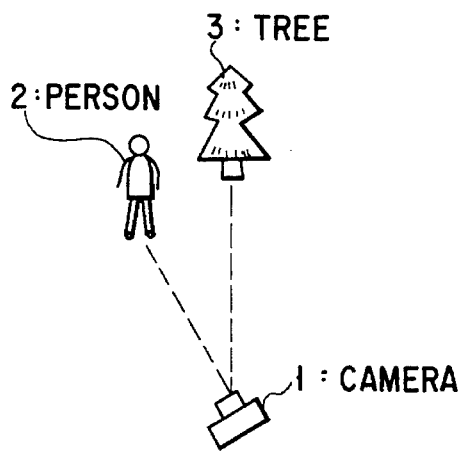
FIGS. 2A to 2D are views showing a series of photographing operations and a photographic image plane in photography.
Figure 2B:
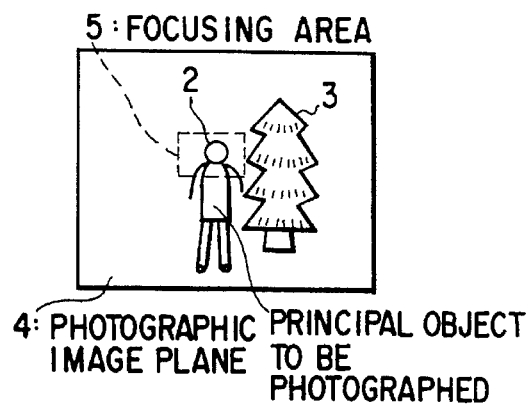
Figure 2C:
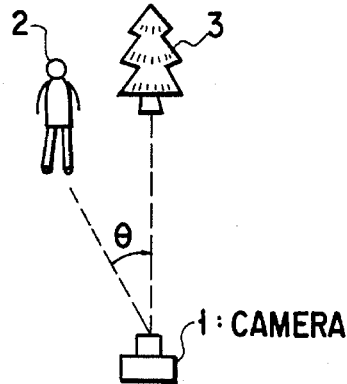
Figure 2D:
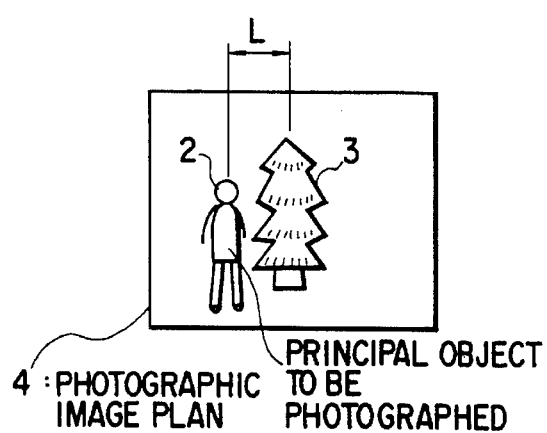

FIGS. 2A to 2D show a series of photographing operations. FIGS. 2A and 2B illustrate the state in which a camera 1 locks the focus on a person 2, as a principal object to be photographed, with a tree 3, as a background, by positioning the person 2 in a focusing area 5 in the center of a photographic image plane 4. FIGS. 2C and 2D illustrate the state in which the camera is rotated through an angle θ from the state shown in FIG. 2A to place the tree 3 in the center of the photographic image plane 4 and the release button is depressed to the second stroke. The gist of the present invention is to obtain position information of the principal object after a field angle is changed, by detecting a moving amount L of the principal object shown in FIG. 2D.

FIG. 1 is a block diagram showing the concept of the first embodiment of the present invention. A camera shake detecting unit 11 detects and outputs an angular velocity applied to a camera main body 10. In practice, two angular velocity sensors are generally mounted to detect angular velocities in the pitch and yaw directions. The output from the camera shake detecting unit 11 is supplied to a moving amount (principal object position) calculating unit 13 via a camera rotational angle calculating unit 12. The moving amount (principal object position) calculating unit 13 outputs the calculation result to a recording unit 14.

When the camera shake detecting unit 11 detects an angular velocity applied to the camera main body 10, the camera rotational angle calculating unit 12 calculates the rotational angle of the camera main body 10 from the focus lock as described above to the ON operation of the 2RSW, i.e., the angle θ shown in FIG. 2C, on the basis of the output from the camera shake detecting unit 11. Subsequently, the moving amount (principal object position) calculating unit 13 calculates the moving amount of a principal object to be photographed in a photographic image plane and obtains position information of the principal object on the basis of the moving amount.

Since it can be considered that the magnification of a taking lens (not shown) used in the camera main body 10 is small and so the parallel movement of the camera main body 10 is sufficiently small compared to its rotational movement, the moving amount L can be approximated by the following expression.

$$L \approx f \tan \theta \qquad (1)$$

where f is the focal length of the taking lens.

Figure 3:
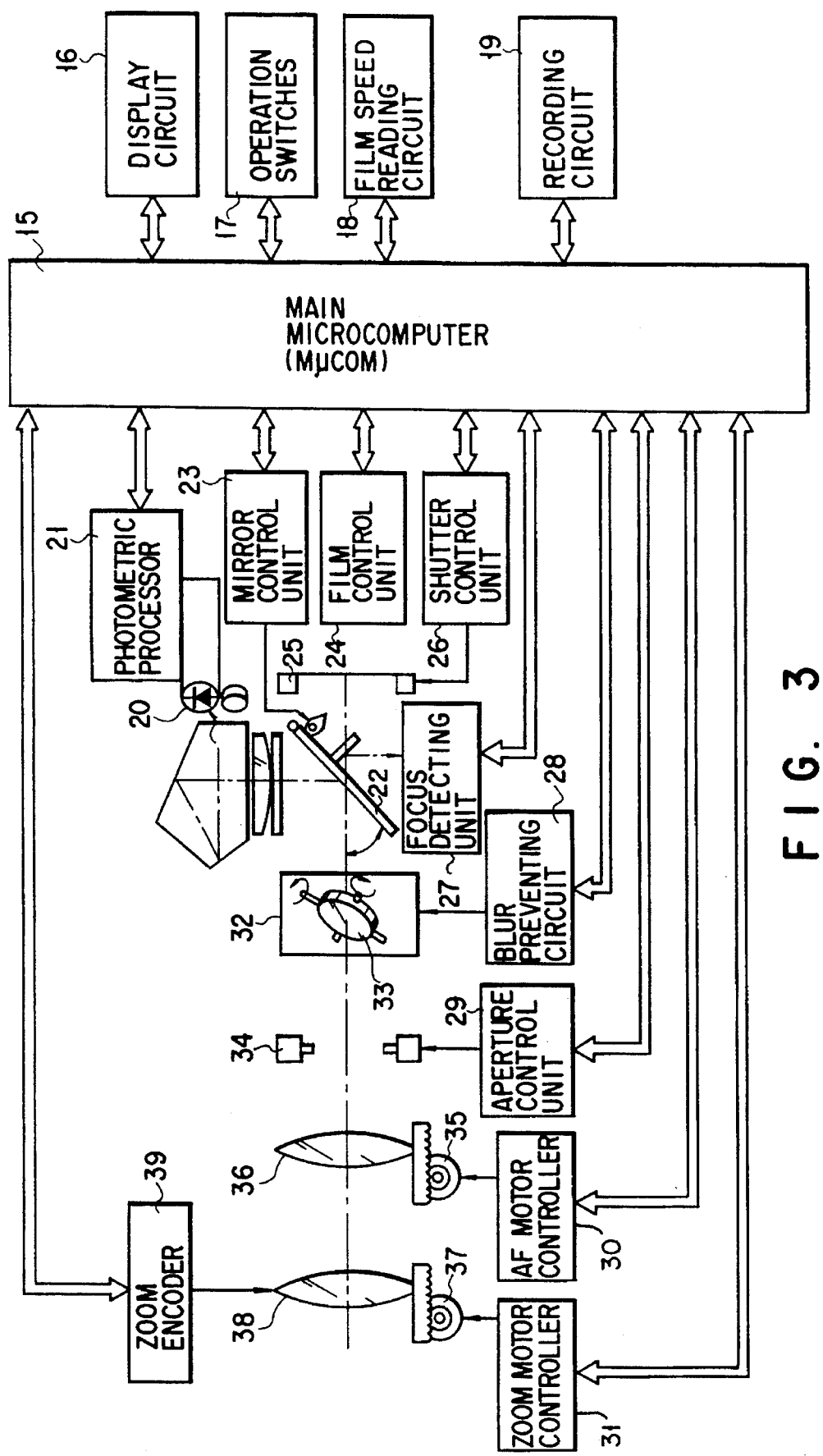
FIG. 3 is a block diagram showing the arrangement of a camera capable of compensating for a camera shake according to the first embodiment of the present invention.

FIG. 3 is a block diagram showing the arrangement of a camera capable of compensating for a camera shake, as a practical example of the first embodiment of the present invention.

As illustrated in FIG. 3, a main microcomputer (to be abbreviated as Mµ COM hereinafter) 15 for controlling the sequences of the entire camera and performing various operations is electrically connected to a display circuit 16, operation switches 17, a film speed reading circuit 18, and a recording circuit 19. The display circuit 16 displays an operation mode or data calculated by the Mµ COM 15. The operation switches 17 include, e.g., a release switch, a main switch, a mode switch, and a zoom switch. The film speed reading circuit 18 reads the DX code of a film and outputs the film speed information to the Mµ COM 15. The recording circuit 19 records photographic information in a recording track of a film.

A photoelectric converting device 20 for photometry is electrically connected to the Mµ COM 15 via a photometric processor 21. This photometric processor 21 detects the luminance of an object to be photographed on the basis of a photocurrent from the photoelectric converting device 20, and outputs the luminance information to the Mµ COM 15.

The Mµ COM 15 is also electrically connected to a mirror control unit 23, a film control unit 24, and a shutter control unit 26. The mirror control unit 23 controls up/down of a quick return mirror 22. The film control unit 24 controls automatic winding, automatic rewinding, and the like of a film (not shown). The shutter control unit 26 controls the front and rear curtains of a focal-plane shutter 25. In addition, the Mµ COM 15 is electrically connected to a focus detecting unit 27, a blur preventing circuit 28, an aperture control unit 29, an AF motor controller 30, and a zoom motor controller 31.

The blur preventing circuit 28 controls a camera shake detector for detecting a camera shake of the camera and an antivibration mechanism 32 including a gimbal mechanism. The gimbal mechanism of this antivibration mechanism 32 can tilt parallel glass 33 independently in the pitch and yaw directions by using two motors (not shown). The antivibration mechanism 32 with this gimbal mechanism tilts the parallel glass 33 in accordance with a camera shake so that the displacement of an image by the parallel glass 33 and the displacement of the image by the camera shake cancel each other, thereby preventing the image blur.

The aperture control unit 29 controls a stop 34 on the basis of aperture data calculated by the Mµ COM 15.

The focus detecting unit 27 outputs data required to detect a shift of focus to the Mµ COM 15. On the basis of this data, the Mµ COM 15 calculates the moving amount of a taking lens 36 required for focusing. An AF motor is driven under the control of an AF motor controller 30 on the basis of the calculated moving amount. In addition, in response to an operation of the zoom switch, a zoom motor controller 31 drives a zoom motor 37 to move a taking lens 38 back and forth, thereby performing zooming. During the zooming, an absolute position of the taking lens 38 can be detected from information from a zoom encoder 39. This absolute position is fetched as focal length information by the Mµ COM 15.

Figure 4:
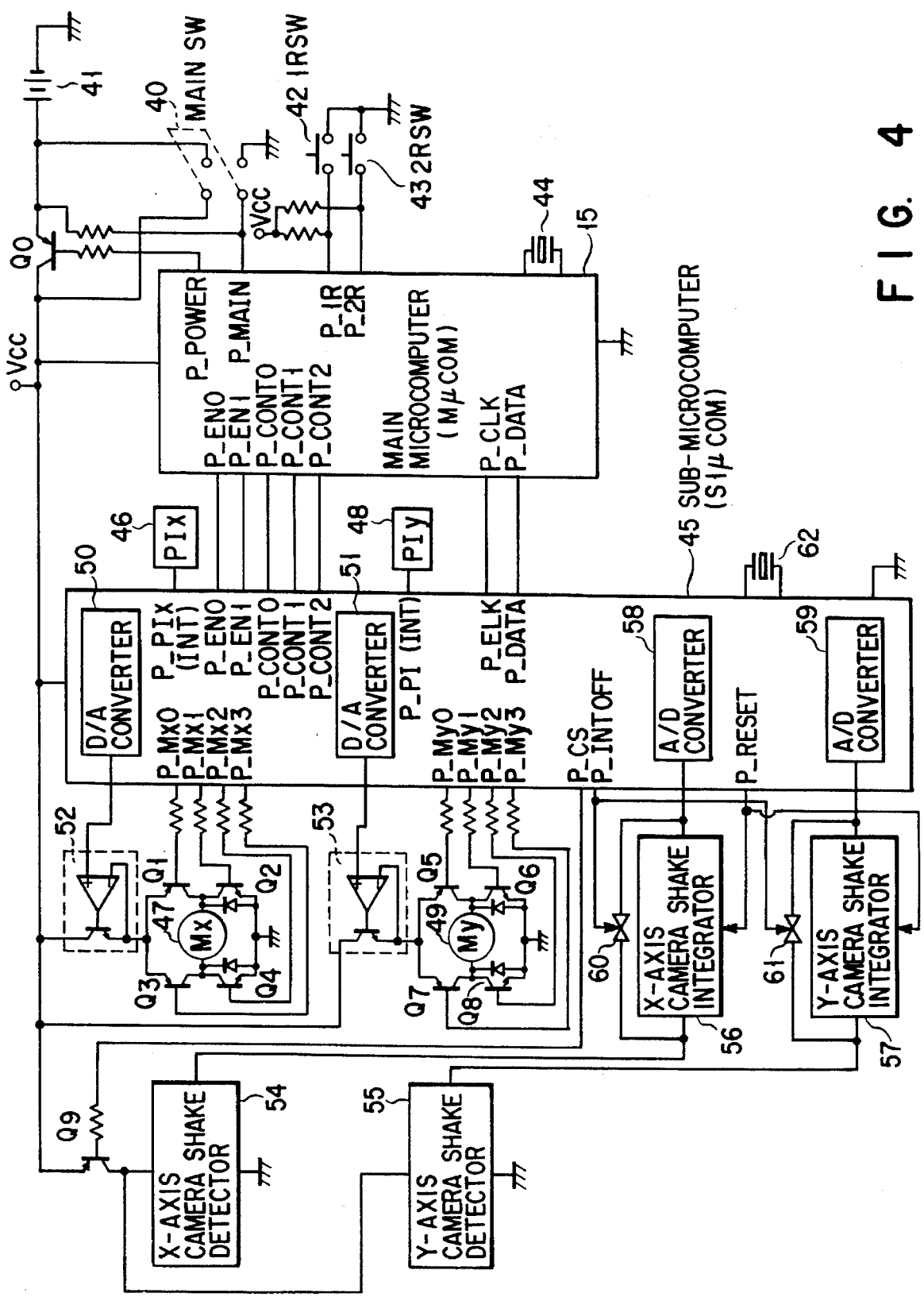
FIG. 4 is a block diagram showing details of the arrangement of a blur preventing circuit 28 in FIG. 3.

The details of the arrangement of the blur preventing circuit 28 will be described below with reference to FIG. 4.

A main switch (MAINSW) 40 is used to control the supply of power in the camera according to this embodiment and constituted by a duplex switch. When the main switch 40 is turned on, the power of a battery 41 is supplied to the camera system, and the Mµ COM 15 is powered on and reset to start its operation. That is, when a port P_MAIN changes from high level "H" to low level "L", the Mµ COM 15 immediately changes the signal level of an output port P_POWER from high level "H" to low level "L", thereby turning a transistor Q0 on. As a result, the power supply is held.

1RSW 42 and 2RSW 43 are switches interlocked with the release button. When the release button (not shown) is depressed to the first stroke, the 1RSW 42 is turned on to start automatic focusing. When the release button is depressed completely, the 2RSW 43 is also turned on to start a shutter. Note that an oscillator 44 outputs an operation clock for the Mµ COM 15.

A first sub-microcomputer (to be abbreviated as S1µ COM hereinafter) 45 is connected to the Mµ COM 15. This S1µ COM 45 executes a camera shake compensation. The S1µ COM 45 operates on the basis of output control signals from output ports P_EN0, P_EN1, P_CONT0, P_CONT1, and P_CONT2 of the Mµ COM 15. The Mµ COM 15 and the S1µ COM 45 are connected through serial communication lines by P_CLK and P_DATA.

A photointerrupter (PI) 46 generates a pulse signal in association with rotation of an X-axis motor 47 of the gimbal mechanism of the antivibration mechanism described above and outputs the signal to an input port P_PIx. Likewise, a photointerrupter 48 generates a pulse signal in association with rotation of a Y-axis motor 49 and outputs the signal to an input port P_PIy. With these pulse signals, the S1µ COM 45 can detect the tilt angle of the parallel glass 33 within the antivibration mechanism 32, i.e., can detect the displacement of an image caused by the parallel glass 33. In this embodiment, it is assumed that a rotation in the pitch direction is a rotation about the X axis, and a rotation in the yaw direction is a rotation about the Y axis.

The output voltages from D/A converters 50 and 51 of the S1µ COM 45 are amplified by buffers 52 and 53 and applied to a bridge circuit consisting of transistors Q1 to Q4 and a bridge circuit consisting of transistors Q5 to Q8, respectively. The D/A converters 50 and 51 control the rotating speeds of the motors.

The bridge circuit constituted by the transistors Q1 to Q4 is connected to the X-axis motor 47 and controls the direction of rotation of the motor through output ports P_Mx0 to P_Mx3. The bridge circuit consisting of the transistors Q5 to Q8 is connected to the Y-axis motor 49 and controls the direction of rotation of the motor by signals from output ports P_My0 to P_My3.

The amount of camera shake of the gimbal mechanism with respect to the X axis is detected by an X-axis camera shake detector 54, and that with respect to the Y axis is detected by a Y-axis camera shake detector 55. Note that each of the detectors 54 and 55 is constituted by an angular velocity sensor (vibration gyro) and supplied with power via a transistor Q9. This transistor Q9 is controlled by an output from an output port P_CS.

The outputs from the X-axis camera shake detector 54 and the Y-axis camera shake detector 55 are input to A/D converters 58 and 59 via an X-axis camera shake integrator 56 and a Y-axis camera shake integrator 57, respectively. The camera shake integrators 56 and 57 can be shorted by turning analog switches 60 and 61 on, respectively. In this case, the outputs from the X-axis camera shake detector 54 and the Y-axis camera shake detector 55 are directly input to the A/D converters 58 and 59, respectively.

The analog switches 60 and 61 are turned on by setting an output port P_INTOFF to high level "H". The X-axis camera shake integrator 56 and the Y-axis camera shake integrator 57 are initialized by setting P_RESET to high level "H". Note that an oscillator 62 outputs an operation clock for the S1µ COM 45.

Figure 5:
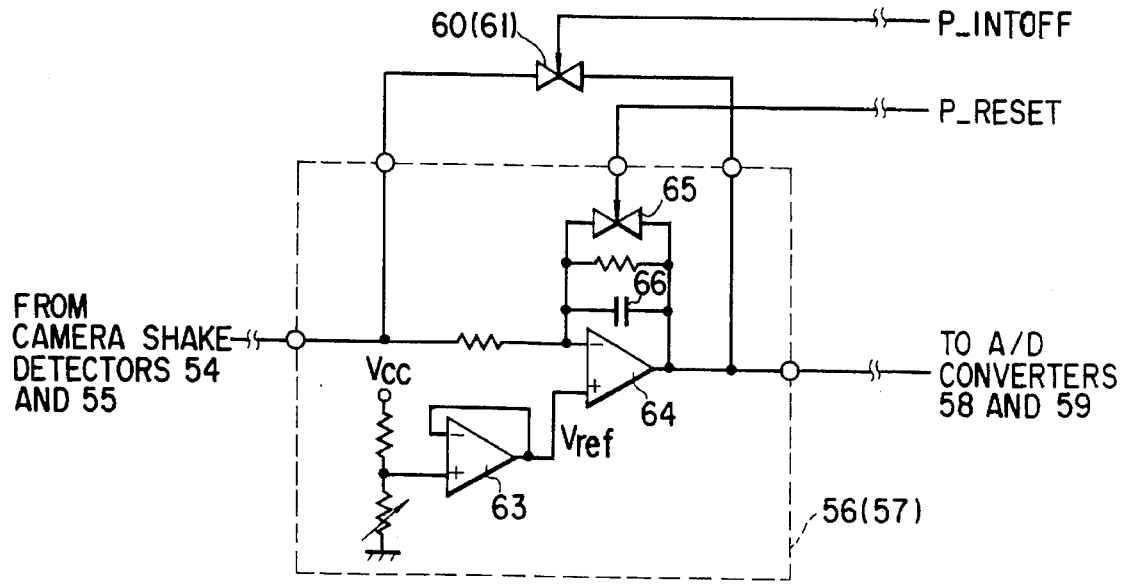
FIG. 5 is a circuit diagram showing the arrangement of an X-axis camera shake integrator 56 and a Y-axis camera shake integrator.

FIG. 5 shows a practical circuit configuration of the X-axis camera shake integrator 56 and the Y-axis camera shake integrator 57. Note that only one system is illustrated in FIG. 5 since circuits with the same configuration are used for the X and Y axes.

Referring to FIG. 5, an operational amplifier 63 is constituted by a buffer amplifier for determining a reference voltage $V_{ref}$ which is generally set at one-half of a power supply voltage $V_{cc}$. An operational amplifier 64 performs an integral action. Since the operational amplifier 64 is constituted by a general integrating circuit, a detailed description thereof will be omitted. An analog switch 65 is turned on when the output port P_RESET is set at high level "H", initializing the integrator by discharging a capacitor 66.

Figure 6:
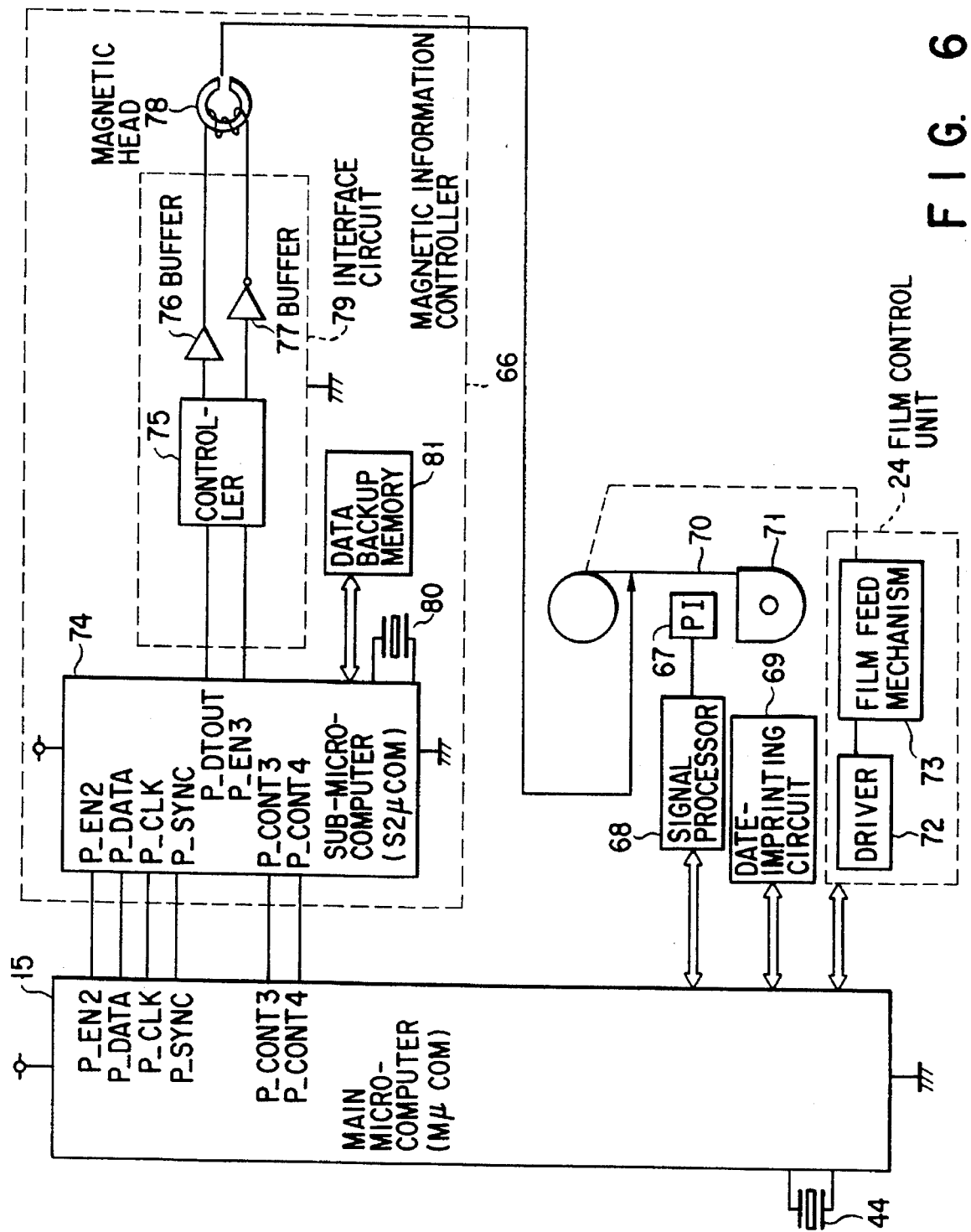
FIG. 6 is a block diagram showing the arrangement of a recording circuit 19 and its peripheral portion in FIG. 4.

The arrangement of the recording circuit 19 and its peripheral portion in FIG. 3 will be described below with reference to FIG. 6.

A magnetic information controller 66 is connected to the Mµ COM 15 and executes data recording on the basis of a command from the Mµ COM 15. A photointerrupter (to be abbreviated as PI hereinafter) 67 is used to detect the moving amount and the moving velocity of a film. A signal from this PI 67 is converted into a pulse signal by a signal processor 68 and transferred to the Mµ COM 15. Consequently, the moving amount and the moving velocity of the film are detected. Note that reference numeral 70 denotes a film; and 71, a magazine which houses the film 70.

The Mµ COM 15 is also connected to a data-imprinting circuit 69 and a driver 72 incorporated in the film control unit 24. The date-imprinting circuit 69 forms date data and optically records the data on the film 70. On the basis of a control signal from the Mµ COM 15, the driver 72 drives an internal motor of a film feed mechanism 73 for feeding the film 70. The driver 72 and the film feed mechanism 73 constitute the film control unit 24.

The arrangement and the operation of the magnetic information controller 66 will be described below.

A second sub-microcomputer (to be abbreviated as S2µ COM hereinafter) 74 executes data recording on the basis of a command from the Mµ COM 15. Ports P_DATA and P_CLK are used in communication between the S2µ COM 74 and the Mµ COM 15. This communication is done by a serial communication scheme. A port P_EN2 is the enable port of the S2µ COM 74. A port P_SYNC is used to transmit a sync clock necessary to record data in a magnetic track. Ports P_CONT3 and P_CONT4 are used to send control signals from the Mµ COM 15.

The output from the S2µ COM 74 is supplied to a magnetic head 78 via a controller 75 and buffers 76 and 77. The controller 75 and the buffers 76 and 77 constitute an interface circuit 79. A port P_DTOUT is a signal line for sending a signal to the controller 75. A port P_EN3 is the enable port of the controller 75.

Note that the S2µ COM 74 is coupled with an oscillator 80 which outputs an operation clock of the S2µ COM 74. The S2µ COM 74 is also coupled with a DATA backup memory 81 which stores data transferred from the Mµ COM 15 until a recording operation is started. As this memory 81, a nonvolatile memory is required which does not lose data even if the power supply to the camera is shut off.

Figure 7:
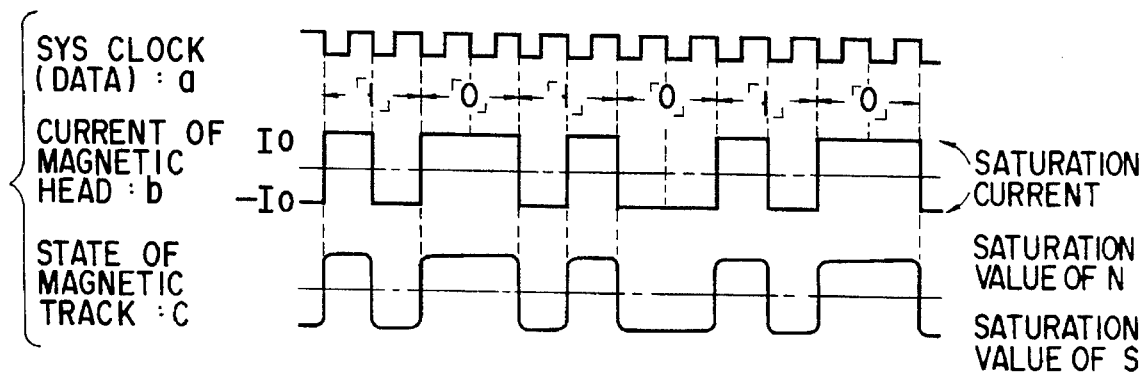
FIG. 7 is a timing chart for explaining the operation when data is recorded by frequency modulation.

FIG. 7 is a timing chart when data is recorded by frequency modulation.

In the frequency modulation, 1-bit data is formed on a magnetic substance by using two sync clocks (a) (FIG. 7) applied to the port P_SYNC. If the data is "1", a current to be flowed to the head is inverted each time the sync clock is input. If the data is "0", the current to the head is inverted for the first sync clock, but no reaction is made for the second sync clock. With this operation, a magnetic track on a film 85 is magnetized in the same form as the waveform of the current.

For example, assume that the data (a) shown in FIG. 7 is input to P_DATA. In this case, the waveform of a current (b) (FIG. 7) of the magnetic head is output from P_DTOUT, and the magnetic track is magnetized in a state (c) of a magnetic track in FIG. 7. The current to be flowed to the magnetic head 78 is output from the buffers 76 and 77 of the interface circuit 79.

Figure 9A:
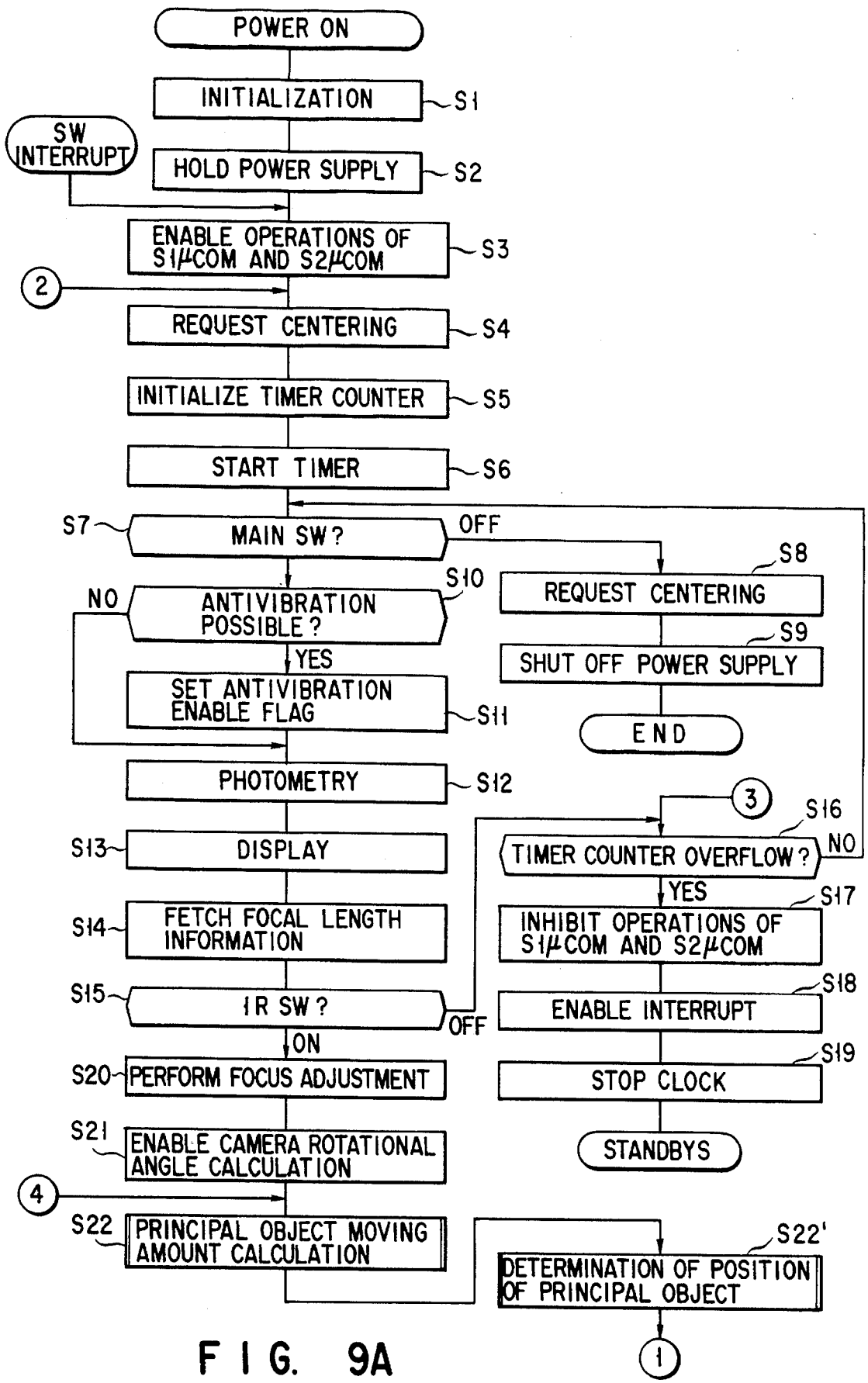
FIGS. 9A and 9B are flow charts for explaining the operation of a main microcomputer (Mμ COM) 15.
Figure 9B:
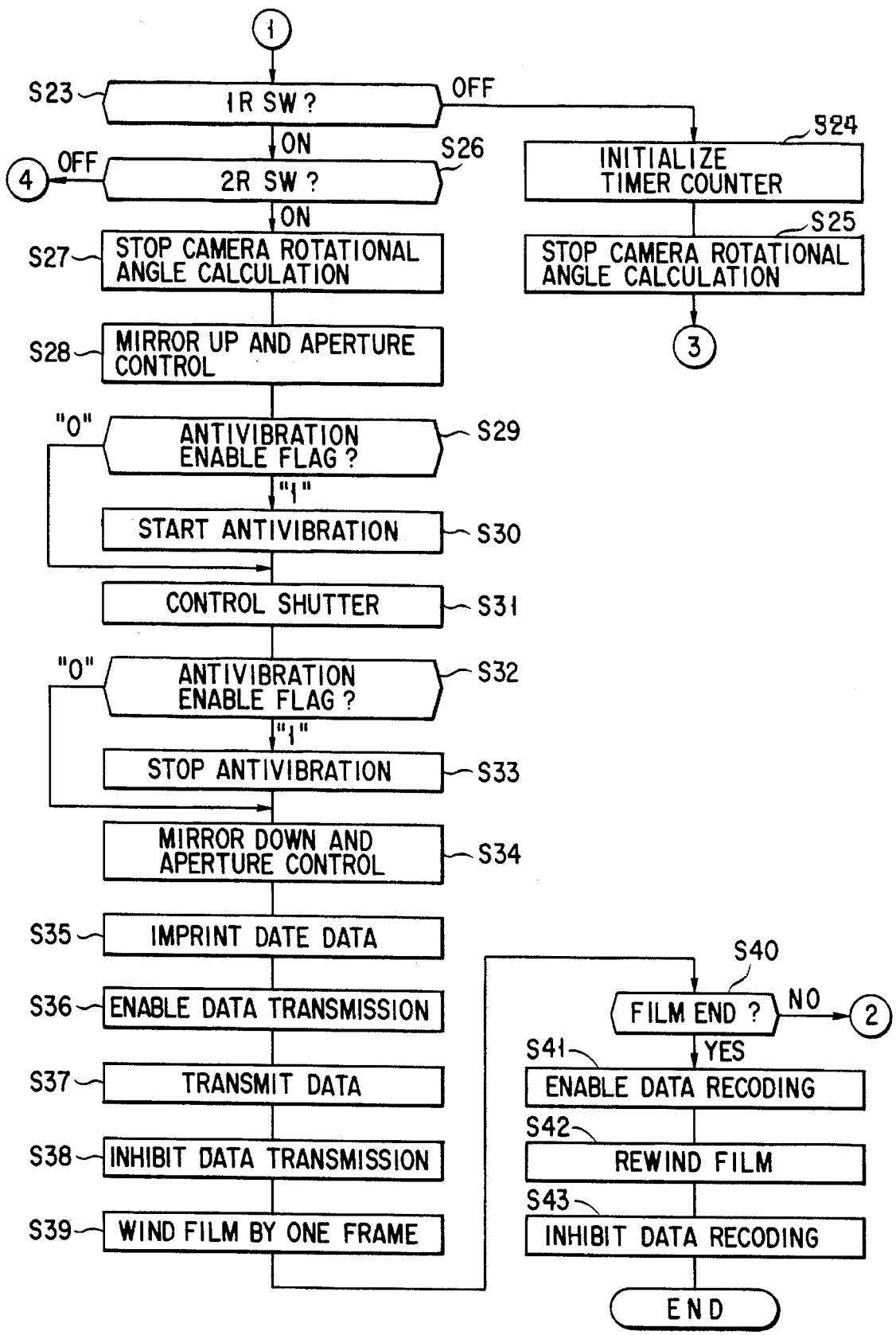

The operation of the Mµ COM 15 will be described below with reference to the flow charts shown in FIGS. 9A and 9B.

When the MAINSW 40 is turned on by a user, the Mµ COM 15 is powered on and reset to start the operation. First, the Mµ COM 15 initializes the I/O ports and the memory (step S1), and changes the signal level of the port P_POWER from high level "H" to low level "L", turning the transistor Q0 on. Consequently, the power supply to the Mµ COM 15 is held (step S2).

Subsequently, the Mµ COM 15 changes the signal levels of the output ports P_EN0 and P_EN2 from high level "H" to low level "L", enabling the operations of the S1µ COM 45 and the S2µ COM 74 (step S3). As described earlier, the S1µ COM 45 detects a camera shake of the camera and compensates for blur of an image of a picture resulting from the camera shake. The S2µ COM 74 records data in a magnetic track as described before. Details of the operations of the S2µ COM 45 and the S1µ COM 74 will be described later.

The Mµ COM 15 then outputs a centering request signal to the output port P_CONT0 of the S1µ COM 45. Upon receiving this centering request signal, the S1µ COM 45 drives the parallel glass 33 to be perpendicular to the optical axis of the taking lens. By this centering operation by the S1µ COM 45, therefore, the parallel glass 33 is set in the center of the range of rotation of the parallel glass 33 (step S4).

This centering operation is necessary after an antivibration operation. That is, there is the possibility that the parallel glass 33 is displaced from the center of the rotation range upon application of an excess shock to the camera while the camera is not used by a user. The centering operation is executed to compensate for this displacement.

Subsequently, the Mμ COM 15 initializes a timer counter (step S5) and causes the timer to start counting (step S6). In this embodiment, the timer counter is so designed as to overflow in, e.g., 30 seconds. When the timer counter overflows, the Mμ COM 15 sets the standby mode.

The Mμ COM 15 then checks the state of the MAINSW 40 (step S7). If the MAINSW 40 is OFF, the Mμ COM 15 outputs the centering request to the S1μ COM 45 (step S8). The Mμ COM 15 switches the signal level of the output port P_POWER from low level "L" to high level "H", turning the transistor Q0 off (step S9). With this operation, the power supply to the camera system is shut off, and consequently the Mμ COM 15, the S1μ COM 45, and the S2μ COM 74 stop their operations.

On the other hand, if the MAINSW 40 is ON in step S7, the flow advances to step S10. Since the output signals from the X- and Y-axis camera shake detectors 54 and 55 require a certain period of time to become stable, the antivibration operation cannot be executed immediately after the ON operation of the power supply. For this reason, the S1μ COM 45 checks whether the antivibration operation is possible (step S10). When the outputs from the X- and Y-axis camera shake detectors 54 and 55 become usable, the S1μ COM 45 changes the signal level of the output port P_EN1 from high level "H" to low level "L". The Mμ COM 15 receives the state of P_EN1 from the input port P_EN1 to check whether the S1μ COM 45 can execute the antivibration operation. If the antivibration operation is possible, the Mμ COM 15 sets an antivibration enable flag to "1" (step S11).

Thereafter, the Mμ COM 15 receives luminance information of an object to be photographed from the photometric processor 21, calculating an aperture value and a shutter speed value (step S12). In addition, the Mμ COM 15 displays these data by using the display circuit 16 (step S13).

Subsequently, the Mμ COM 15 reads out the position of the taking lens 38, which moves back and forth by zooming, from the zoom encoder 39, thereby obtaining a focal length f (step S14). Thereafter, the Mμ COM 15 checks whether the 1RSW 42 is ON or OFF (step S15). If the 1RSW 42 is turned on by depressing the release button to the first stroke, the flow advances to step S20 (to be described later).

If the 1RSW 42 is OFF, the flow advances to step S16, and the Mμ COM 15 checks whether the timer counter overflows (step S16). If the timer counter does not overflow, the flow returns to step S7. On the other hand, if a user does not operate the release button for a predetermined time period, the timer counter overflows. In this case, the flow advances to step S17.

In step S17, the Mμ COM 15 changes the signal levels of the output ports P_EN0 and P_EN2 from low level "L" to high level "H", thereby disabling the operations of the S1μ COM 45 and the S2μ COM 74. Consequently, the S1μ COM 45 and the S2μ COM 74 are set in the standby mode.

Subsequently, the Mμ COM 15 enables an interrupt (step S18). If any of the MAINSW 40, the 1RSW 42, the 2RSW 43, and the external switches such as the electronic flash switch and the mode switch is operated, an interrupt signal is generated. The Mμ COM 15 stops the oscillation of the oscillator 44 (step S19) to set the standby mode.

Note that the standby mode is released by the interrupt signal. When the standby mode is released, the oscillator 44 starts oscillating, and the Mμ COM 15 starts its operation from step S3 described above.

If the 1RSW 42 is ON in step S15, the Mμ COM 15 calculates a shift of the focal point on the basis of output data from the focus detecting unit 27. The Mμ COM 15 then moves the taking lens 36 by using the AF motor controller 30 to adjust the focal point (step S20).

Subsequently, the Mμ COM 15 outputs a camera rotational angle calculation enable signal to the S1μ COM 45 (step S21). This is done by changing the signal level of P_CONT2 from high level "H" to low level "L". The Mμ COM 15 then receives the camera rotational angle calculation result transmitted from the serial communication ports (P_DATA and P_CLK), calculates the moving amount of a principal object to be photographed, and forms position data based on the moving amount as will be described later (step S22). Note that the subroutine in step S22 will be described in detail later.

Figure 8:
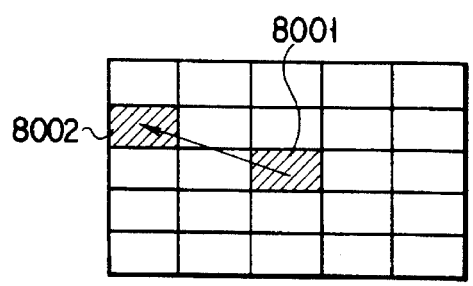
FIG. 8 is a view for explaining the operation of the first embodiment, which illustrates the state in which a photographic image plane is divided into a plurality of areas and the moving position of a principal object to be photographed is determined.

After calculating the moving amount of the principal object, the Mμ COM 15 checks the position of the principal object in an image plane in step S22'. In this embodiment, the image plane is divided into a plurality of areas as illustrated in FIG. 8. On the basis of the calculated moving amount, the Mμ COM 15 checks a specific area to which the principal object moves from a focusing area 8001. The Mμ COM 15 forms data indicating that area as the position data (e.g., if the principal object moves to an area 8002, the Mμ COM 15 forms data indicating the area 8002).

Subsequently, the Mμ COM 15 again checks the state of the 1RSW 42 (step S23). If the 1RSW 42 is OFF, the Mμ COM 15 again initializes the timer counter (step S24) and outputs a camera rotational angle calculation stop signal (step S25). Thereafter, the flow returns to step S16.

On the other hand, if the 1RSW 42 is kept on, the Mμ COM 15 checks the state of the 2RSW 43 (step S26). If the 2RSW 43 is OFF, the flow returns to step S22, and the Mμ COM 15 repeatedly executes steps S22 to S26 until the 2RSW 43 is turned on.

If the 2RSW 43 is ON in step S26, the Mμ COM 15 outputs the camera rotational angle calculation stop signal (step S27). This is done by changing the signal level of P_CONT2 from low level "L" to high level "H". The Mμ COM 15 then controls the mirror control unit 23 to move the mirror up and also controls the aperture control unit 29 to set the stop 32 to a predetermined value (step S28). Thereafter, the Mμ COM 15 checks the state of the antivibration enable flag (step S29).

If the antivibration enable flag is "1", this means that the S1μ C0M 45 can execute camera shake compensation. Therefore, the Mμ COM 15 switches the signal level of the output port P_CONT from high level "H" to low level "L" (step S30). In response to this operation, the S1μ COM 45 starts the camera shake compensation.

Subsequently, the Mμ COM 15 controls the shutter control unit 26 to expose the film 70 for a predetermined time period (step S31). Thereafter, the Mμ COM 15 again checks the antivibration enable flag (step S32). If the antivibration enable flag is "1", the Mμ COM 15 changes the signal level of the output port P_CONT1 from low level "L" to high level "H" (step S33). In response to this operation, the S1μ COM 45 stops the camera shake compensation (step S33).

The Mμ C0M 15 then moves the mirror 22 down and sets the stop 34 at a full-aperture value (step S34). Subsequently, the Mμ COM 15 causes the date-imprinting circuit 69 to record the data on the lower right portion of the film 70 (step S35). The Mμ COM 15 then enables transmission of the position data based on the principal object moving amount to the S2μ COM 74 (step S36). This is accomplished by changing the signal level of the port P_CONT3 from high level "H" to low level "L". The Mμ COM 15 transmits the data to the S2μ COM 74 by using the serial communication line (step S37).

After the transmission, the Mμ COM 15 inhibits data transmission (step S38). This is done by returning the signal level of P_CONT3 to high level "H". The Mμ COM 15 then winds the film 70 by one frame (step S39) and checks whether the film end is reached (step S40). If the Mμ COM 15 determines that the film end is not reached, the flow returns to step S4, and the above operation is repeatedly executed. If the film end is determined in step S40, the Mμ COM 15 enables the 2μ COM 74 to perform data recording (step S41). This is done by changing the signal level of the port P_CONT4 from high level "H" to low level "L".

Subsequently, the Mμ COM 15 rewinds the film 70 into the magazine 71 (step S42). The Mμ COM 15 then inhibits the data recording by the S2μ COM 74 (step S43). This is accomplished by returning the signal level of P_CONT4 to high level "H".

In this manner, a series of operations are completed. If a new film 70 is loaded after the magazine 71 into which the film 70 used is rewound is unloaded from the camera, the operations are again started from step S1.

In addition, if a user operates a forced rewind switch (not shown), it is possible to force the flow to advance to step S41.

The operation of the main routine of the S1μ COM 45 will be described below with reference to the flow charts in FIGS. 10A and 10B.

When a user turns the MAINSW 40 ON, power is supplied to the system, and the S1μ COM 45 starts to operate as in the Mμ COM 15.

The S1μ COM 45 initializes the I/O ports and the memory (step S51), initializes a timer counter (step S52), and starts counting (step S53). A set time of this timer counter is determined by taking account of the response time of the X- and Y-axis camera shake detectors 54 and 55. As an example, if the output from each detector becomes usable in three seconds after the ON operation of the power supply, the timer counter is so set as to overflow in three seconds.

Subsequently, the S1μ COM 45 changes the level of the output signal from the output port P_CS from high level "H" to low level "L". Consequently, the transistor Q9 is turned on to start supplying power to the X-axis camera shake detector 54 and the Y-axis camera shake detector 55 (step S54). The S1μ COM 45 checks whether the centering request is sent from the Mμ COM 15 (step S55). The Mμ COM 15 indicates this centering request by changing the signal level of the port P_CONT0 from high level "H" to low level "L" only during a predetermined time. Upon detecting the centering request from the input port P_CONT0, the S1μ COM 45 executes the subroutine "centering" (step S56).

Figure 11A:
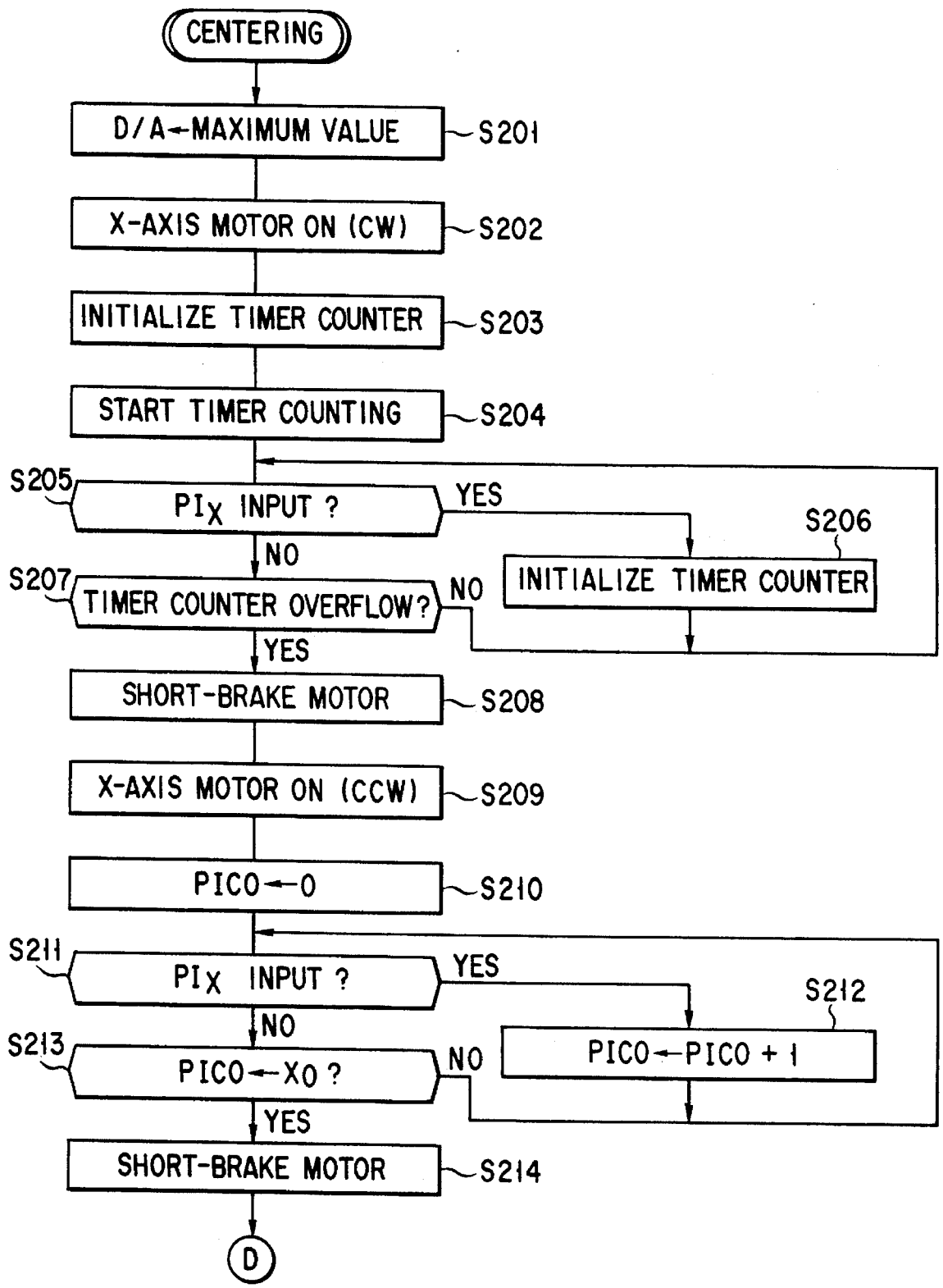
FIGS. 11A and 11B are flow charts showing the sequence of a subroutine "centering" in the first embodiment.
Figure 11B:
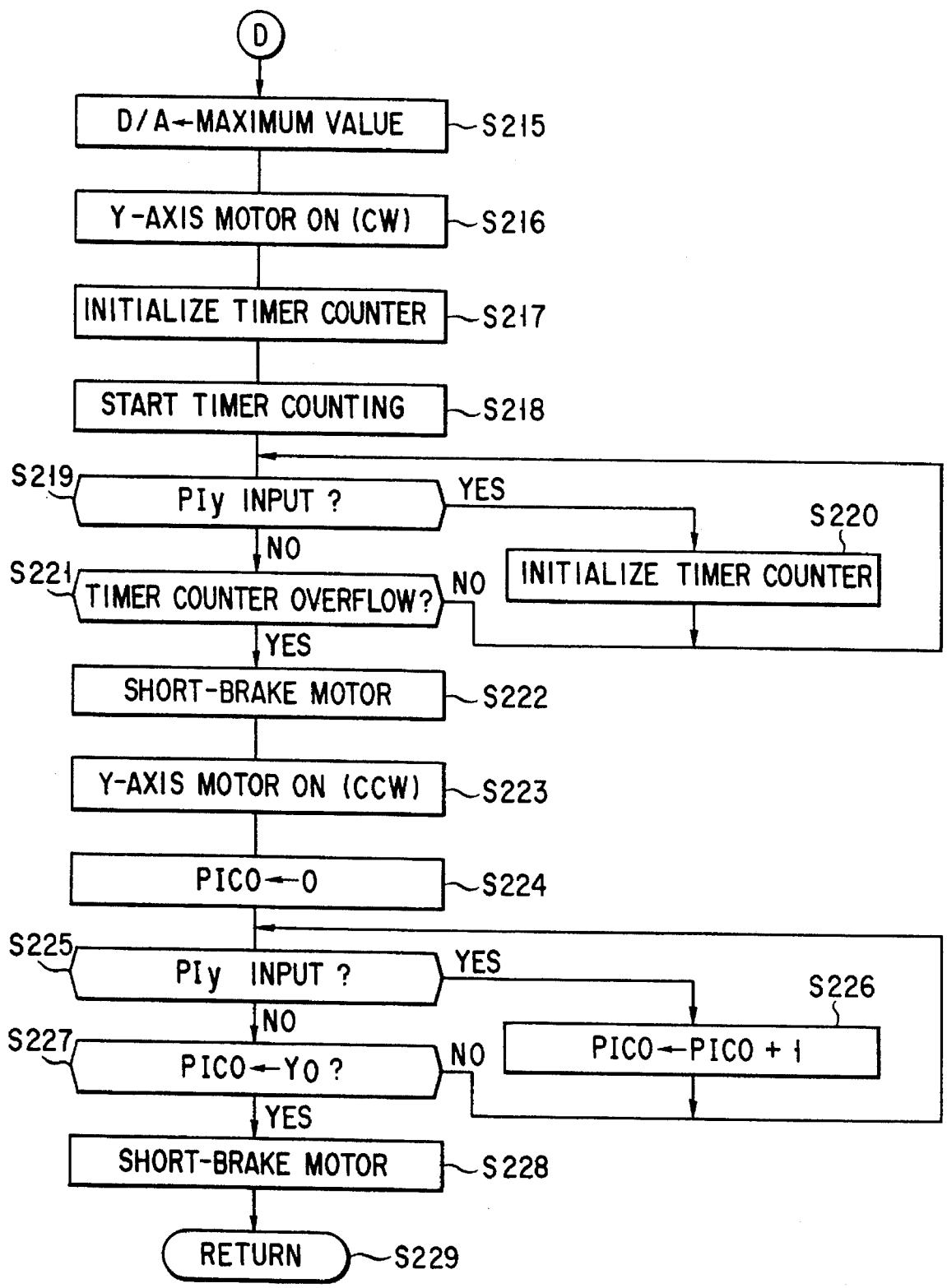

The sequence of the subroutine "centering" executed in step S56 will be described below with reference to the flow charts in FIGS. 11A and 11B.

When this subroutine is started, the parallel glass 33 is set in the center of the rotation range of the parallel glass 33. This makes the optical axis of the taking lens 38 perpendicular to the surface of the glass. That is, a maximum value is set in the D/A converter 50 for determining the driving speed of the X-axis motor (step S201), and a signal for rotating the motor clockwise (CW) is output from the ports P_Mx0 to P_Mx3 (step S202). After the timer counter is initialized, the counter is started (steps S203 and S204). The S1μ COM 45 uses this timer counter to check whether the parallel glass 33 rotates to the limiting end of the rotation range.

Subsequently, on the basis of a change in the pulse signal input from the photointerrupter PIx 46 to the input port P_PIx, the S1μ COM 45 checks whether the parallel glass 33 rotates to the limiting end (steps S205 to S207).

If the motor 47 is rotating, the pulse signal is applied. Therefore, the timer counter does not overflow since it is initialized in step S206. If, however, the parallel glass 33 reaches the limiting end, the motor 47 stops, and the photointerrupter 46 does not generate the pulse signal any longer.

Consequently, the timer counter proceeds counting and eventually overflows, so the flow advances from step S207 to step S208. A signal for short-braking the motor 47 is output from the ports P_Mx0 to P_Mx3 (step S208).

By the above operation, a lever fixed to the X axis of the gimbal mechanism is brought into contact with one of a pair of pins fixed to the camera.

An operation required next is to rotate the parallel glass 33 to an intermediate position within the rotation range on the basis of the limiting end.

For this purpose, the S1μ COM 45 first outputs a signal for rotating the motor 47 counterclockwise (CCW) to P_Mx0 to P_Mx3 (step S209), and detects the rotating amount of the parallel glass 33.

That is, a register (PiCo) which counts the PI pulses, is incremented each time the pulse signal is applied to the input port P_PIx. If the count value of the PiCo agrees with X0, the motor 47 is short-braked (step S214). Note that X0 is a value which represents the rotating amount of the parallel glass 33 from the limiting end to the intermediate value in the rotation range as the pulse number of the photointerrupter. By carrying out the processing (steps S201 to S214) described above, the centering operation for the X axis is completed.

Note that a centering operation for the Y axis is subsequently executed (steps S215 to S228). However, this centering operation is identical to that for the X axis (steps S210 to S214) and a detailed description thereof will be omitted.

Subsequently, the S1μ COM 45 sets an integrator reset flag to "1" (step S57) and checks whether the Mμ COM 15 has enabled the camera rotational angle calculation (step S58). This is accomplished by checking whether the port P_CONT2 is at low level "L". If the S1μ COM 45 determines that the camera rotational angle calculation is not enabled, the flow advances to step S62. If the S1μ COM 45 determines that the calculation is enabled, the S1μ COM 45 executes a subroutine for calculating the rotational angle of the camera from the ON operation of the 1RSW 42 to the ON operation of the 2RSW 43 (step S59). Details of this subroutine will be described later.

Subsequently, the S1μ COM 45 resets the integrator reset flag which is set in step S57 (step S60). Then the S1μ COM 45 checks whether the Mμ COM 15 has issued a stop instruction for the camera rotational angle calculation (step S61). This is done by checking whether the P_CONT2 is at high level "H". The S1μ COM 45 repeatedly executes steps S59 to S61 until the Mμ COM 15 issues the camera rotational angle calculation stop instruction.

If the camera rotational angle calculation stop instruction is detected in step S61, the S1μ COM 45 stops the operations of the integrators (step S62). That is, the S1μ COM 45 sets the port P_INTOFF at high level "H" to turn on the analog switches 60 and 61, thereby shorting the X- and Y-axis camera shake integrators 56 and 57. Consequently, the outputs from the X- and Y-axis camera shake detectors 54 and 55 are directly input to the A/D converters 58 and 59, respectively.

Subsequently, the S1µ COM 45 checks whether the Mµ COM 15 has issued an antivibration request (step S63). That is, the Mµ COM 15 switches the signal level of P_CONT1 from high level "H" to low level "H" during exposure. The S1µ COM 45 executes the camera shake compensation while the input signal from the input port P_CONT1 is at low level "L". That is, upon detecting in step S63 that the signal from P_CONT1 is at low level "L", the S1µ COM 45 executes a subroutine "antivibration" to be described later (step S64). This subroutine is for driving the parallel glass 33 so as to cancel a camera shake during exposure. This subroutine is normally ON during exposure.

Figure 11C:
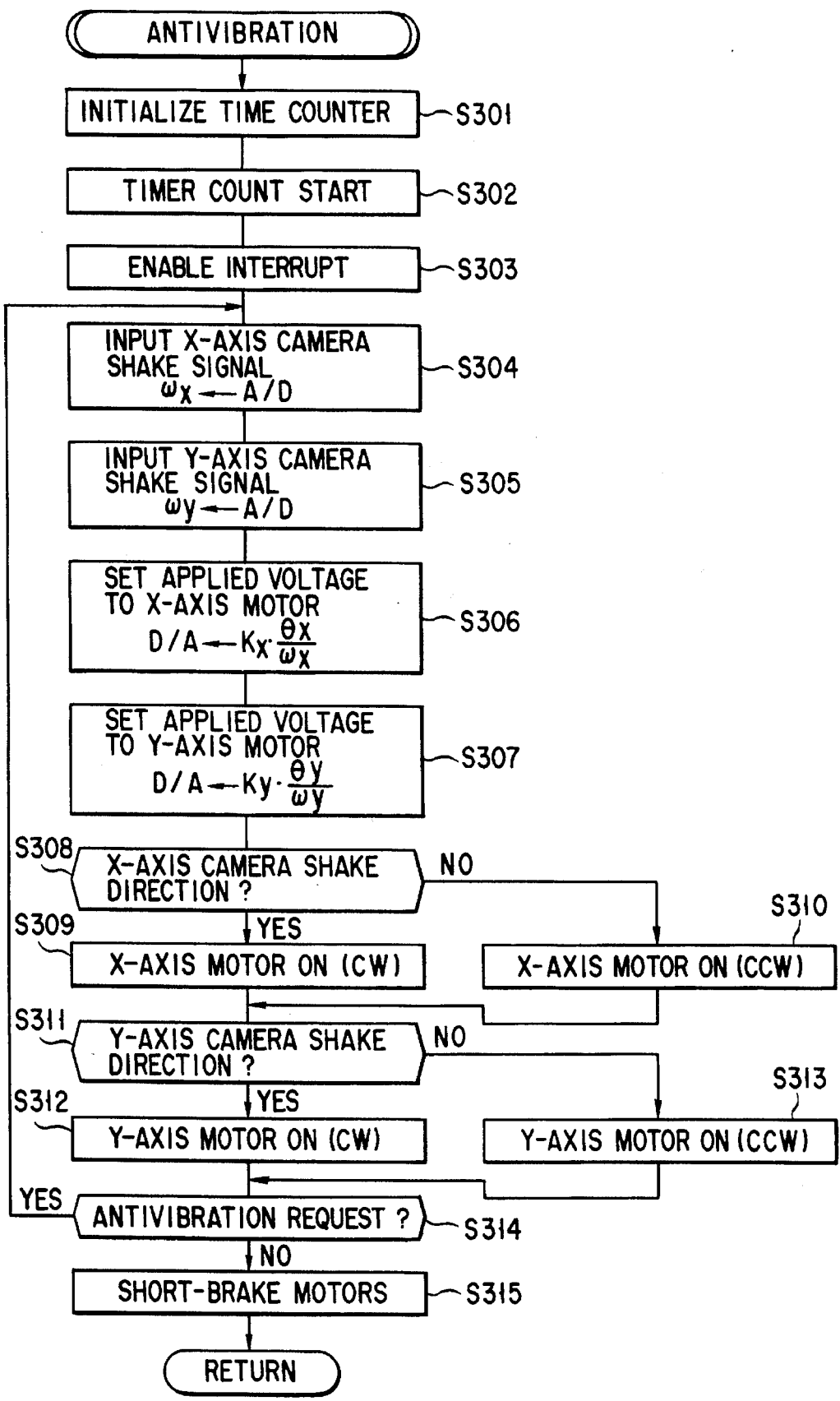
FIG. 11C is a flow chart showing the sequence of a subroutine "antivibration" in the first embodiment.

The sequence of the subroutine "antivibration" operation executed in step S64 will be described below with reference to the flow chart in FIG. 11C.

After initializing the timer counter, the S1µ COM 45 starts timer counter (steps S301 and S302). This timer counter is used to detect the rotating speeds of the X-axis motor 47 and the Y-axis motor 49. Detecting the rotating speeds of the motors 47 and 49 is to obtain the rotating speed of the parallel glass 33 with respect to the X and Y axes of the gimbal mechanism. The rotating speeds of the motors 47 and 49 can be detected by measuring the intervals of the output pulse signals from the photointerrupters 46 and 48 connected to the motors 47 and 49 by using the timer counter.

Subsequently, the S1µ COM 45 enables an interrupt (step S303). This interrupt routine is executed when the pulse signals from the photointerrupters 46 and 48 are input to the input ports P_PIx and P_PIy.

The S1µ COM 45 then supplies the output from the X-axis camera shake detector 54 to the A/D converter 58 (step S304). The output from the A/D converter 58 indicates an angular velocity (dθ x/dt) generated by a camera shake with respect to the X axis. In addition, the S1µ COM 45 supplies the output from the Y-axis camera shake detector 55 to the A/D converter 59 (step S305). The output from the A/D converter 59 gives an indication of an angular velocity (dθ y/dt) generated by a camera shake with respect to the Y axis. Furthermore, the S1µ COM 45 sets data in the D/A converter 50 for setting the rotating speed of the X-axis motor 47 (step S306). This data is calculated from dω x,dt, dθ x/dt, and Kx, and ω x is the rotating speed of the X-axis motor 47. Note that dω x and dt are calculated in the interrupt routine. Note also that Kx is a constant which is determined by taking into consideration, e.g., the reduction ratio of gears attached to the motor, the operation characteristics of the parallel glass 33, and the output characteristics of the X-axis camera shake detector 54.

The S1µ COM 45 then sets data in the D/A converter 51 for setting the rotating speed of the Y-axis motor 49 (step S307). This data is calculated in the same manner as in step S306. Thereafter, the S1µ COM 45 rotates the X-axis motor 47 either clockwise (CW) or counterclockwise (CCW) in accordance with the direction of the X-axis camera shake signal (steps S308 to S310). In addition, the S1µ COM 45 rotates the Y-axis motor 49 either clockwise (CW) or counterclockwise (CCW) in accordance with the direction of the Y-axis camera shake signal (steps S311 to S313). Subsequently, the S1µ COM 45 checks whether the Mµ COM 15 has output an antivibration request signal (step S314).

If P_CONT1 of the Mµ COM 15 is at low level "L", the flow returns to step S304 to continue the antivibration. When the exposure operation by the Mµ COM 15 is thus completed, P_CONT1 goes to high level "H". Consequently, the flow advances from step S314 to step S315. In step S315, the S1µ COM 45 short-brakes the X- and Y-axis motors to end the antivibration operation.

Subsequently, the S1µ COM 45 checks whether the Mµ COM 15 has output an operation enable signal (step S65). The operation of the S1µ COM 45 is enabled while the Mµ COM 15 sets the signal of the port P_EN0 at low level "L". The S1µ COM 45 checks the state of the input port P_EN0. If the signal of P_EN0 is at high level "H", the S1µ COM 45 sets the standby mode and stops its operation.

That is, if the signal of the port P_EN0 is at high level "H", the S1µ COM 45 enables interrupt (step S66). This interrupt signal is generated by the Mµ COM 15 by switching the signal level of the port P_EN0 from high level "H" to low level "L". In response to this interrupt signal, the S1µ COM 45 releases the standby mode and restarts the above operation from step S52.

Subsequently, the S1µ COM 45 switches the signal level of the port P_CS from low level "L" to high level "H", turning the transistor Q9 off (step S67). Consequently, the X- and Y-axis camera shake detectors 54 and 55 stop their operations. To indicate that the camera shake compensation is impossible, the S1µ COM 45 changes the signal level of the port P_EN1 from low level "L" to high level "H" (step S68) and stops the oscillation of the oscillator 62 (step S69). Thereafter, the flow advances to the standby mode.

If the signal of the port P_EN0 is at low level "L" in step S65, the S1µ COM 45 checks whether the timer counter has overflown (step S70). That is, the timer counter overflows if a predetermined time elapses from the start of power supply to the X- and Y-axis camera shake detectors 54 and 55. If the timer counter has overflown, the camera shake compensation can be executed by using the outputs from the X- and Y-axis camera shake detectors 54 and 55. Therefore, the S1µ COM 45 switches the signal level of the port P_EN1 from high level "H" to low level "L" (step S71). Thereafter, the flow advances to step S55, and the above processing is repeatedly executed.

Figure 12:
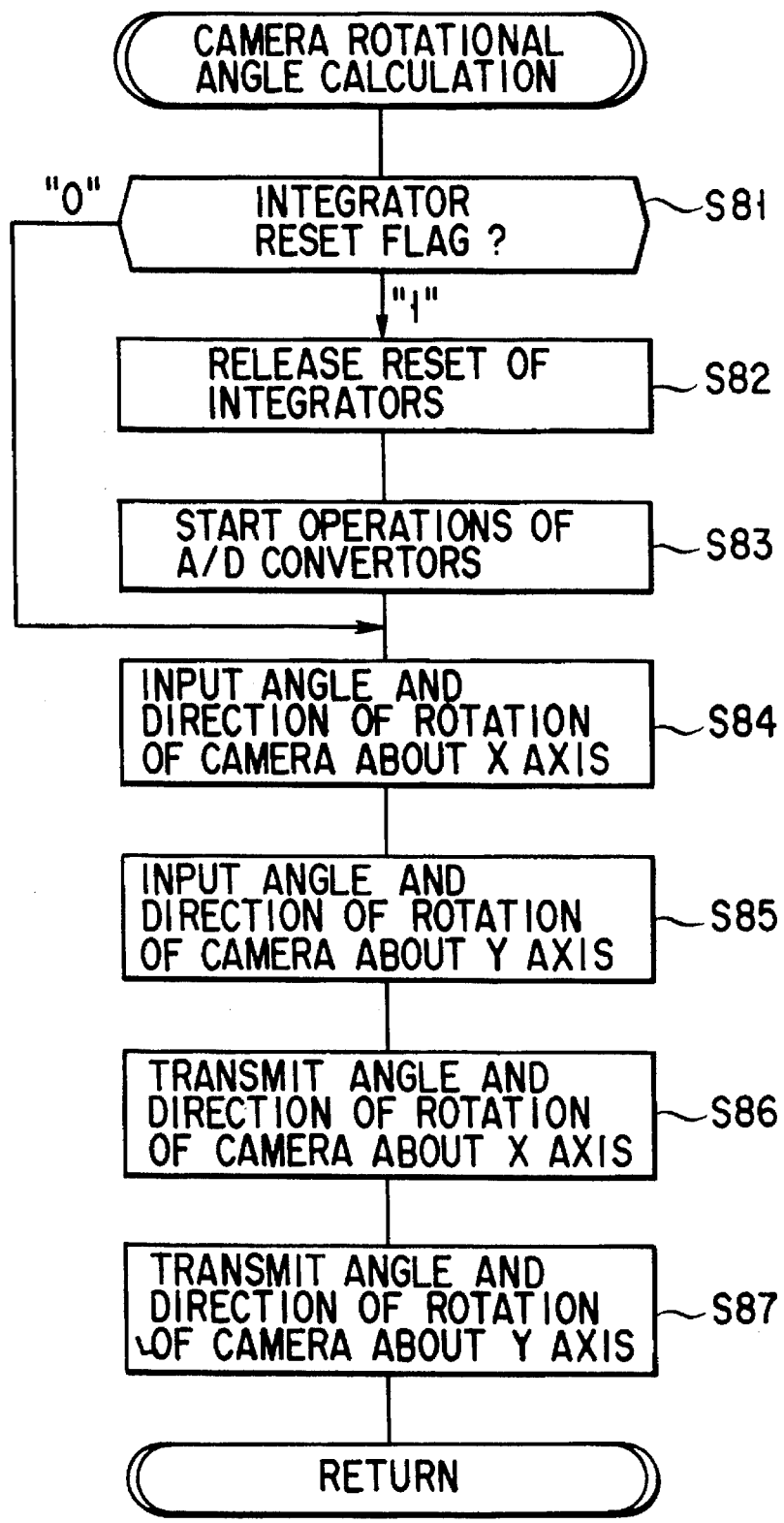
FIG. 12 is a flow chart for explaining the operation of a subroutine "camera rotational angle calculation" in step S59 in FIG. 10A.

The subroutine "camera rotational angle calculation" in step S59 will be described below with reference to the flow chart in FIG. 12.

Figure 10A:
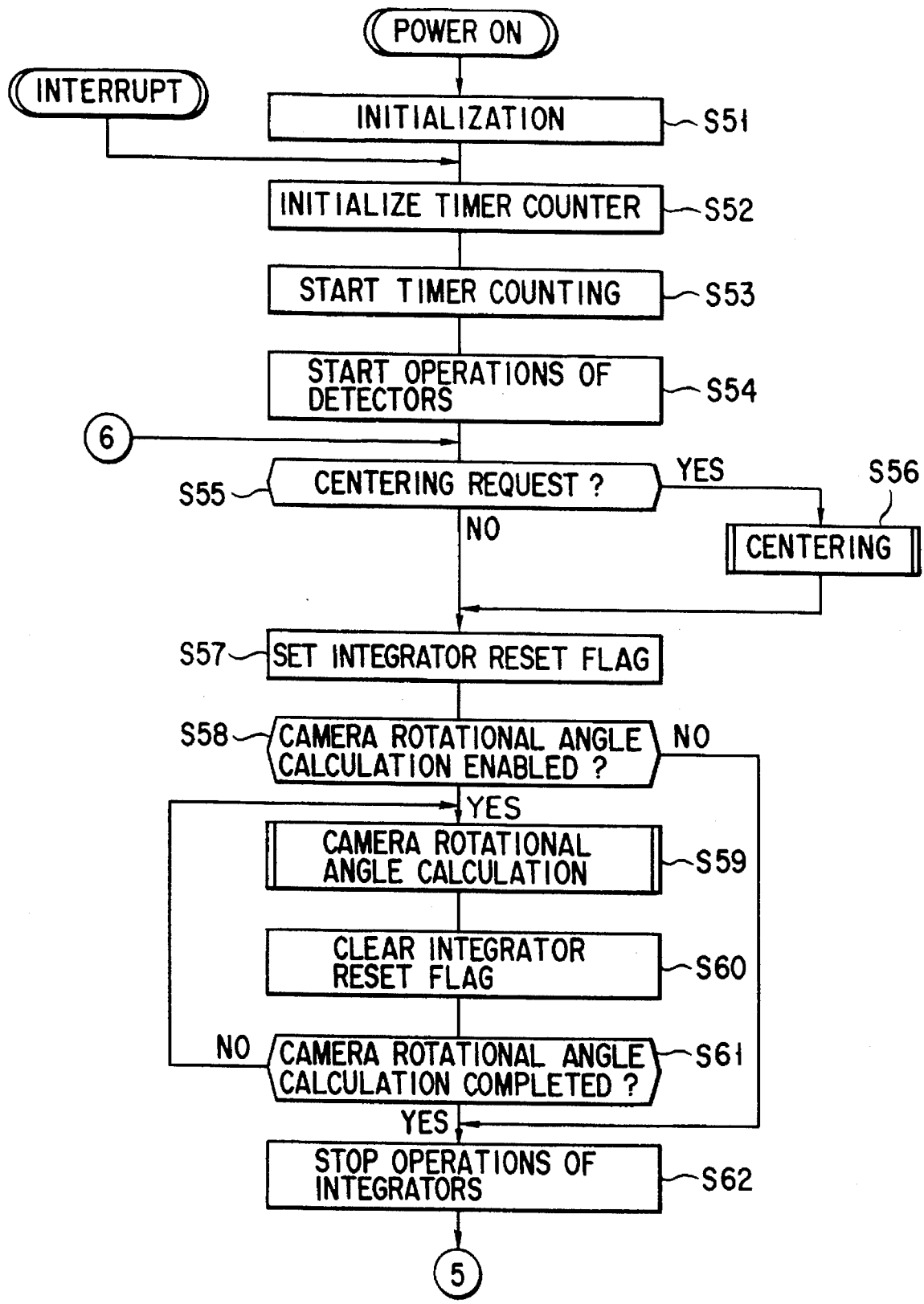
FIGS. 10A and 10B are flow charts for explaining the operation of the main routine of a first sub-microcomputer (S1μ COM) 45.
Figure 10B:
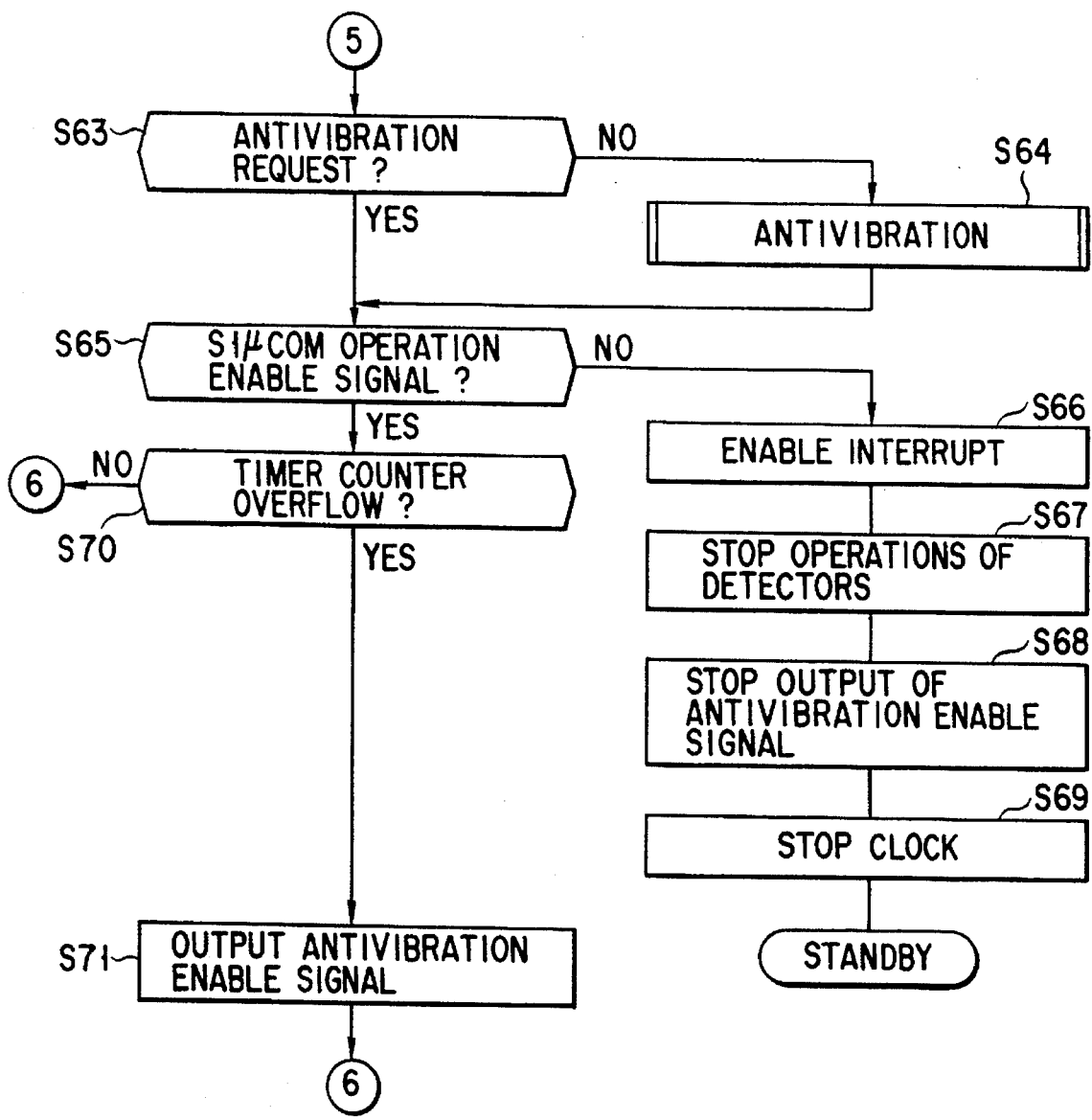

Before this subroutine is called, the ports P_INTOFF and P_RESET are set at low level "L" and high level "H", respectively, in step S51 in FIG. 10A. That is, the analog switches 60 and 61 are not rendered conductive, so the X- and Y-axis camera shake integrators 56 and 57 are not shorted. In addition, the analog switch 65 is rendered conductive and the capacitor 66 is already discharged.

When the subroutine "camera rotational angle calculation" is called, the S1µ COM 45 first checks the integrator reset flag (step S81). If this flag is "1", the S1µ COM 45 releases the reset of the integrators (step S82). That is, the S1µ COM 45 sets the port P_RESET to low level "L" to start charging the capacitor 66. The S1µ COM 45 then starts the operations of the A/D converters 58 and 59 (step S83).

On the other hand, if the integrator reset flag is "0" in step S81, the flow advances to step S84. As described before, the integrator reset flag is set to "1" only for the first time at which this subroutine is called. Therefore, steps S82 and S83 are executed only for this first time.

Subsequently, the S1µ COM 45 inputs the angle and direction of rotation of the camera for each of the X and Y axes. Assume, for example, that when the A/D converters 58 and 59 perform conversion in units of 8 bits between 0 V and $V_{cc}$, the outputs from the X- and Y-axis camera shake integrators 56 and 57 vary about $V_{ref}$ for $V_{ref}=\frac{1}{2}V_{cc}$. In this case, the A/D value (80 H) of the A/D converters 58 and 59 indicates a zero rotational angle, and the difference between 80H and an A/D value at an arbitrary time corresponds to the rotational angle of the camera. The direction of rotation is determined in accordance with whether the A/D value is larger than 80 H. Generally, the rotational angle of the camera from the ON operation of the 1RSW to the ON operation of the 2RSW is much larger than the rotational angle of the camera caused by a camera shake during exposure. Therefore, in order to prevent saturation of the outputs from the camera shake detectors 54 and 55, it is necessary to, e.g., decrease the gains of the internal amplifiers of the camera shake detectors 54 and 55 while the rotational angle of the camera is calculated.

Subsequently, the S1μ COM 45 transmits the rotational angle and direction of the camera obtained in steps S84 and S85 to the Mμ COM 15 by using the serial communication line (steps S86 and S87). Thereafter, the flow returns to the main routine. That is, the latest data is constantly transmitted to the Mμ COM 15 until the S1μ COM 45 determines the camera rotational angle calculation stop in step S61.

Figure 13:
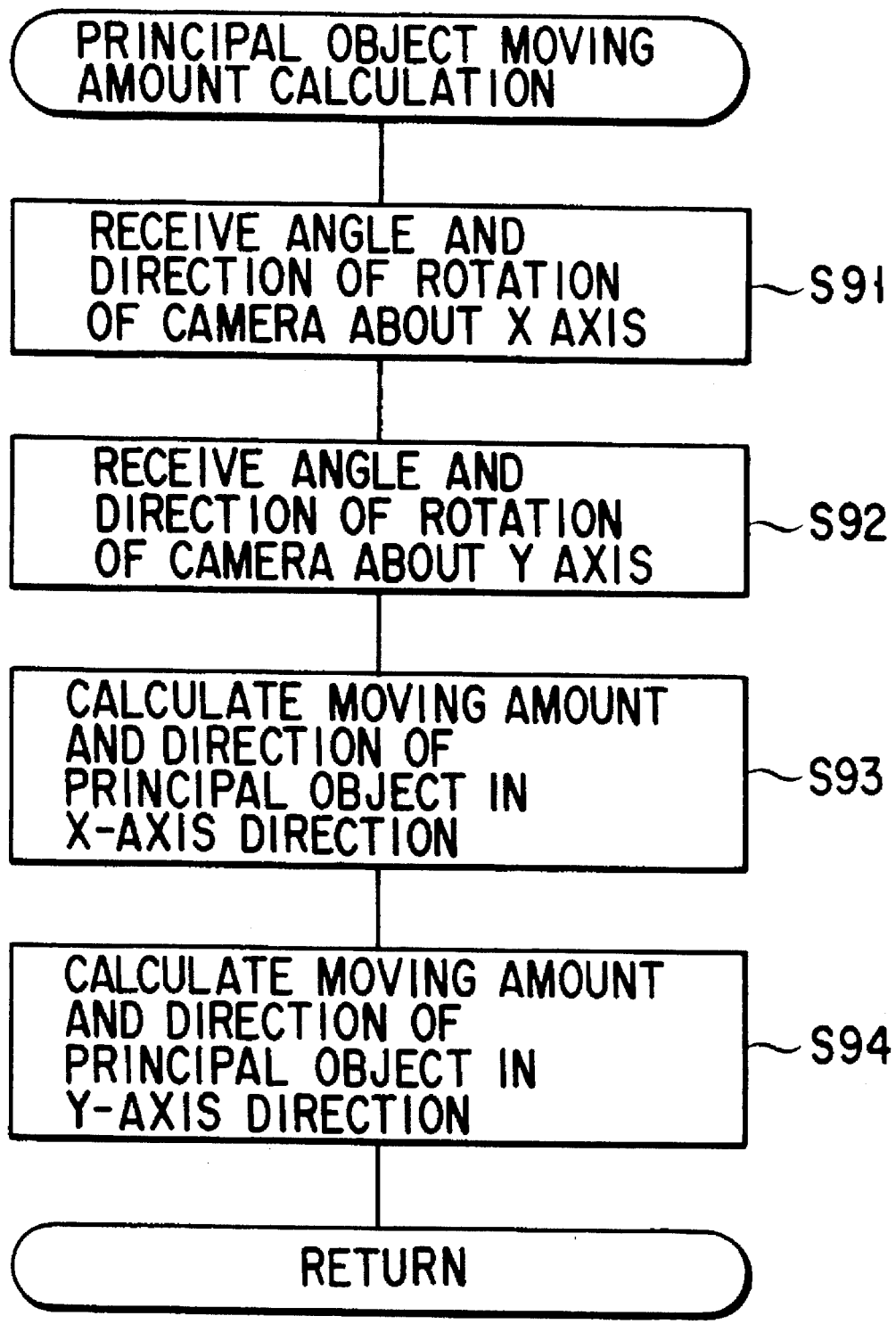
FIG. 13 is a flow chart for explaining the operation of a subroutine "principal object moving amount calculation" in step S22 in FIG. 9A.

The subroutine "principal object moving amount calculation" in step S22 in FIG. 9A will be described below with reference to the flow chart in FIG. 13.

In this subroutine, the Mμ COM 15 first receives the information on the rotational angle and direction of the camera with respect to the X axis from the S1μ COM 45 (step S91). Subsequently, the Mμ COM 15 receives the information on the angle and direction of rotation of the camera with respect to the Y axis in a similar fashion (step S92). The Mμ COM 15 then calculates the moving amount and direction of the principal object in the image plane for each of the X and Y axes (steps S93 and S94). The moving amount is calculated by Expression (1) presented earlier.

The simplest way of the calculation is to store the relationship between the rotational angle information received in steps S91 and S92 and the tangent in the form of a table in the ROM (not shown) of the Mμ COM 15 by considering the sensitivity of the vibration gyro. Consequently, tan θ in Expression (1) is calculated. Since the focal length f in Expression (1) is already obtained in step S14, the moving amount of the principal object in the image plane can be calculated from Expression (1). The moving direction, of course, is obtained from the rotational direction of the camera received in steps S91 and S92. Thereafter, the flow returns to the main routine.

Figure 14:
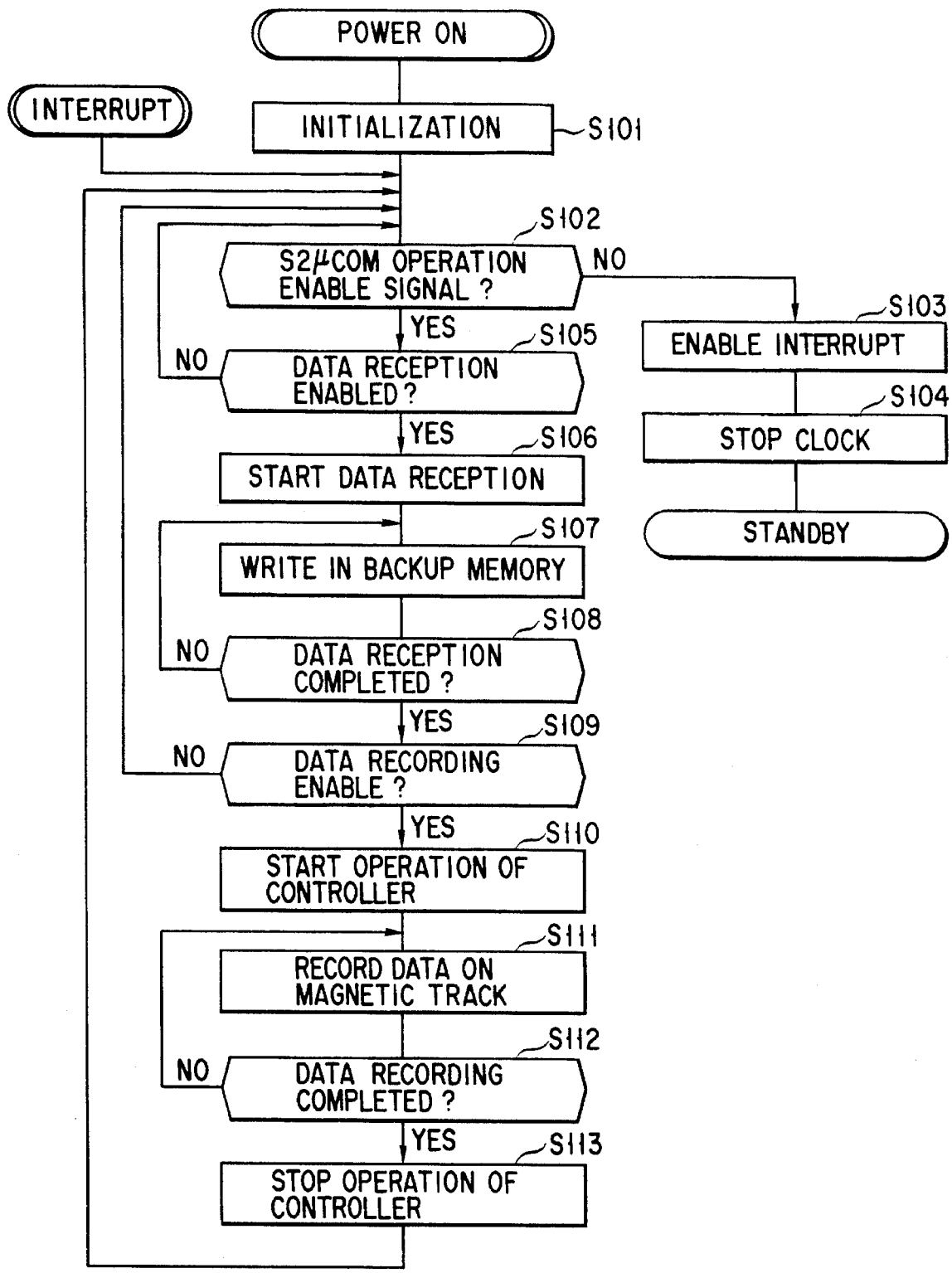
FIG. 14 is a flow chart for explaining the operation of the main routine of a second sub-microcomputer (S2μ COM) 74.

The operation of the S2μ COM 74 will be described below with reference to the flow chart in FIG. 14.

First, the S2μ COM 74 initializes the I/O ports and the memory (step S101). Then, the S2μ COM 74 checks whether the Mμ COM 15 has output an operation enable signal (step S102). In this case, the operation of the S2μ COM 74 is enabled while the Mμ COM 15 sets the port P_EN2 at low level "L". If P_EN2 is at high level "H" in step S102, the S2μ COM 74 enables an interrupt (step S103). This interrupt signal is generated by the Mμ COM 15 by changing the signal level of P_EN2 from high level "H" to low level "L". In response to the interrupt signal, the S2μ COM 74 releases the standby mode and starts the above operation from step S102. Subsequently, the S2μ COM 74 stops the oscillator 80 (step S104), and the flow advances to the standby mode.

On the other hand, if the S2μ COM 74 determines in step S102 that P_EN2 is at low level "L", the S2μ COM 74 then checks whether data reception is enabled (step S105). This is done by checking whether the port P_CONT3 is at low level "L". If it is determined that P_CONT3 is at high level "H", this means that the reception is not enabled. Therefore, the S2μ COM 74 repeatedly executes steps S102 and S105 until the reception is enabled.

If P_CONT3 is at low level "L" in step S105, the S2μ COM 74 starts receiving data (step S106). The S2μ COM 74 writes the received data at a predetermined address of the DATA backup memory 81 (step S107). Then, the S2μ COM 74 checks whether the data reception is completed (step S108). This is accomplished by checking whether the port P_CONT3 is at high level "H".

Since data is kept transmitted while P_CONT3 is at low level "L", the S2μ COM 74 repeats steps S107 and S108 to keep receiving and writing the data until P_CONT3 goes to high level "H". If, on the other hand, the S2μ COM 74 determines in step S108 that P_CONT3 is at high level "H", the S2μ COM 74 ends the reception and write access.

Subsequently, the S2μ COM 74 checks whether data recording is enabled (step S109). This is done by checking whether the port P_CONT4 is at low level "L". The data recording is not enabled while P_CONT4 is at high level "H". Therefore, the flow returns to step S102, and the S2μ COM 74 repeats the above operation until the data recording is enabled. If it is determined in step S109 that P_CONT4 is at low level "L", the S2μ COM 74 starts the operation of the controller 75 by setting the port P_EN3 at low level "L" (step S110).

The S2μ COM 74 then records the data stored in the DATA backup memory 81 in a magnetic track (not shown) on the film 70 (step S111). At this time, the Mμ COM 15 is executing rewinding of the film 70. Thereafter, the S2μ COM 74 checks whether the data recording is completed (step S112). This is done by checking whether P_CONT4 is at high level "H". Recording of data is continued while P_CONT4 is at low level "L". When P_CONT4 goes to high level "H", the S2μ COM 74 changes P_EN3 to high level "H", stopping the operation of the controller 75 (step S113). Thereafter, the flow returns to step S102.

By a series of the operations of the Mμ COM 15, the S1μ COM 45, and the S2μ COM 74 as described above, the rotational angle of the camera from the ON operation of the 1RSW to the ON operation of the 2RSW can be detected by the angular velocity sensor, the position of the principal object to be photographed in the image plane can be determined on the basis of the moving amount of the principal object in the image plane, and the determination result can be recorded in the magnetic track on the film.

Note that it is also possible to record the moving amount data itself, rather than the position determination data, of a principal object to be photographed. In this case, the position of the principal object is determined by a printing unit.

The second embodiment of the present invention will be described below.

In the above first embodiment, the rotational angle of a camera is obtained, and the position of a principal object to be photographed, which is based on the moving amount of the principal object in the image plane, is determined from the rotational angle. However, if the luminance of the principal object is simultaneously calculated and recorded, this data is useful in exposure correction during printing. In this second embodiment, luminance data of a principal object to be photographed in the central portion of an image plane when the focus is locked by turning a 1RSW 42 on is also calculated and recorded together with principal object position data based on the moving amount of the principal object in the image plane. In this case, the photometric scheme is desirably spot photometry.

Figure 15:
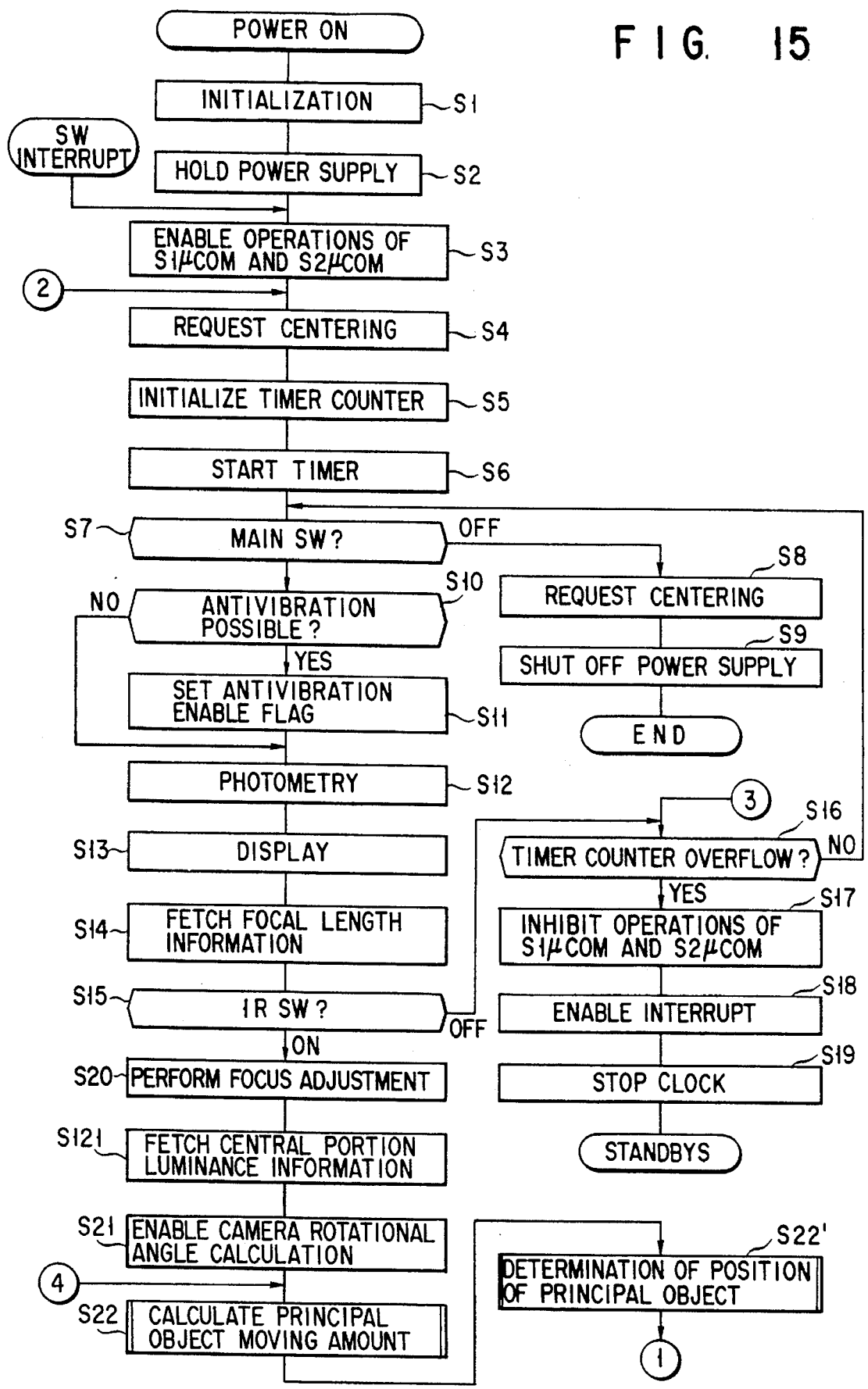
FIG. 15 is a flow chart for explaining the operation of an Mμ COM 15 according to the second embodiment of the present invention.

The operation of an Mμ COM 15 according to the second embodiment will be described below with reference to the flow chart in FIG. 15. Note that the difference of the second embodiment from the above-mentioned first embodiment is step S121 alone, and the processing operations in other steps in the second embodiment are identical to those of the flow charts in FIGS. 9A and 9B in the first embodiment. Therefore, in FIG. 15, the same reference numerals as in FIGS. 9A and 9B denote steps having the same functions as in the first embodiment, and a detailed description thereof will be omitted.

In step S15, a photometric processor 21 measures the luminance of a principal object to be photographed in a central portion when a 1RSW 42 is turned on. In step S121, the Mμ COM 15 stores the photometric result into a RAM. The operations of an S1μ COM 45 and an S2μ COM 74 are also basically identical to those in the first embodiment. That is, in step S37, the Mμ COM 15 transmits to the S2μ COM 74 the photometric result and data of the position of the principal object, which is based on the moving amount of the principal object in the image plane. The S2μ COM 74 records these data in a magnetic track on a film 70.

The third embodiment of the present invention will be described below.

In this third embodiment, the focus is locked on a principal object to be photographed by use of a camera with a focus lock button.

Figure 16:
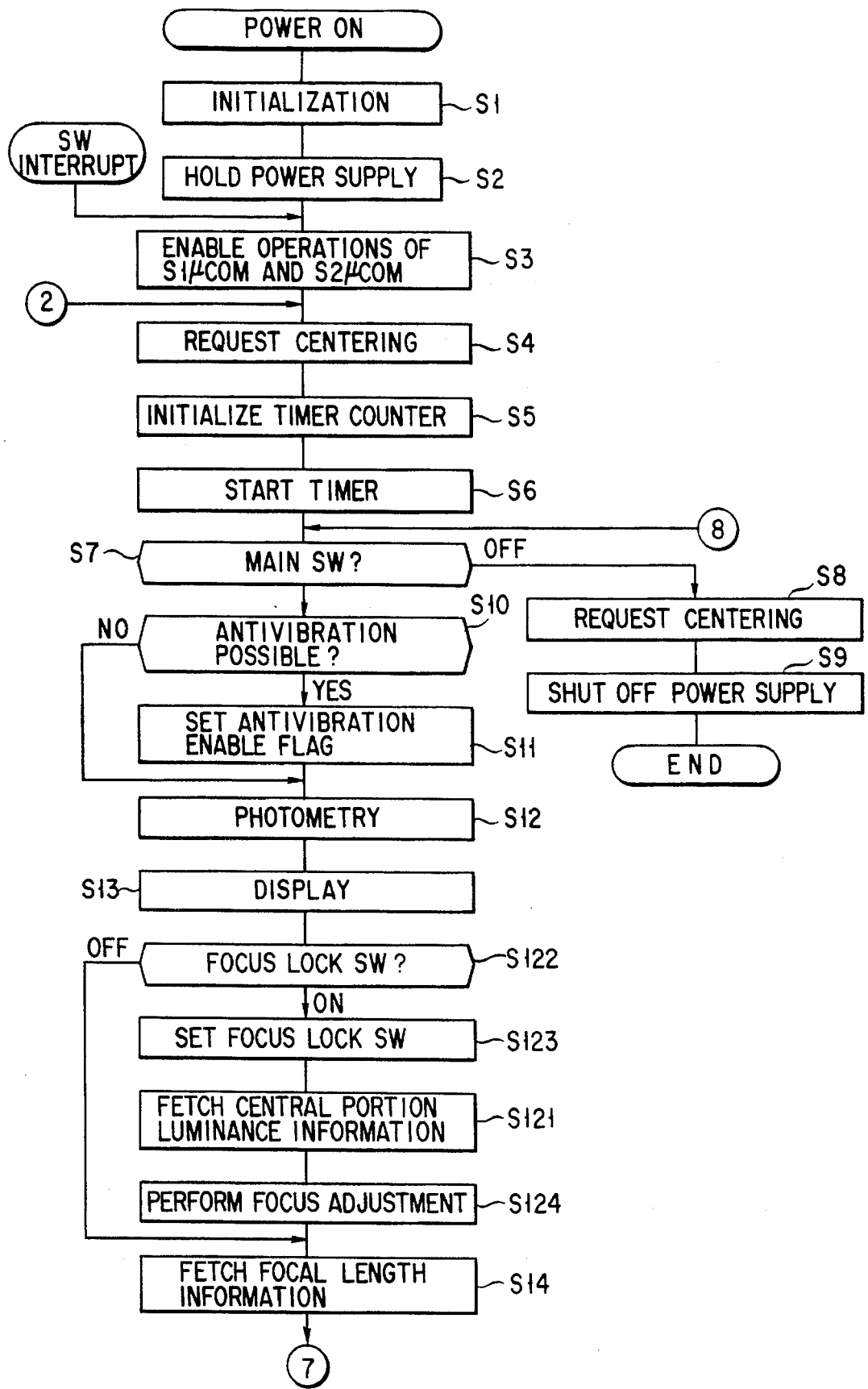
FIG. 16 is a flow chart for explaining the operation of an Mμ COM 15 according to the third embodiment of the present invention.
Figure 17:
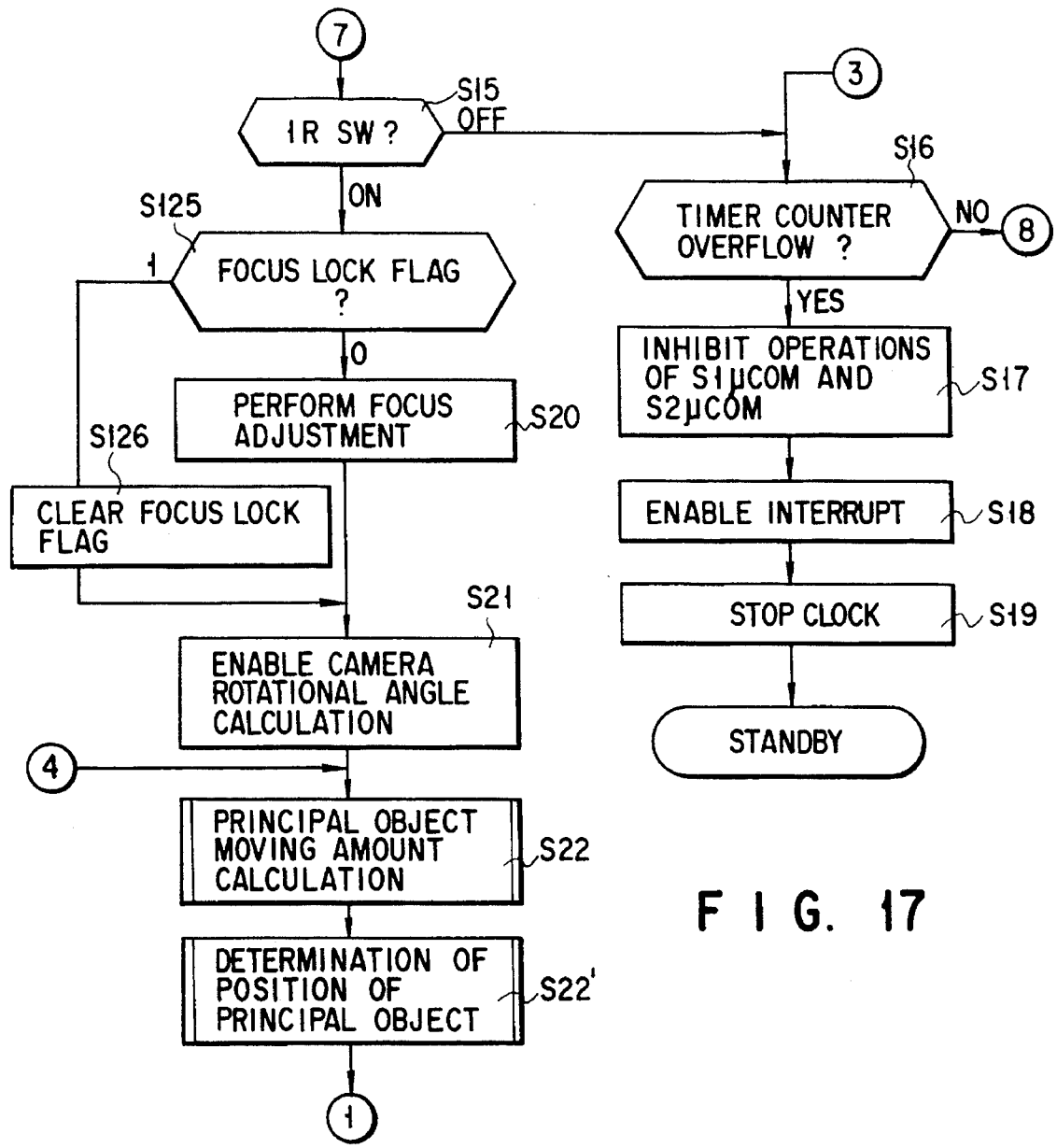
FIG. 17 is a flow chart for explaining the operation of an Mμ COM 15 according to the fourth embodiment of the present invention.

The operation of an Mμ COM 15 in the third embodiment will be described below with reference to the flow charts in FIGS. 16 and 17. Note that in FIGS. 16 and 17, the same step numbers as in FIGS. 9A, 9B, and 15 denote the same processing operations as in the first and second embodiments described above, and only additional operations will be explained.

After displaying data in step S13, the Mμ COM 15 checks in step S122 whether a focus lock switch (not shown) is ON. If the focus lock switch is OFF, the flow advances to step S14. If the focus lock switch is ON, the Mμ COM 15 sets a focus lock flag to "1" in step S123.

As explained in the second embodiment, the Mμ COM 15 stores central portion luminance information in a RAM in step S121. After focus adjustment is performed in step S124, the flow advances to step S14. Subsequently, the Mμ COM 15 checks in step S15 whether a 1RSW 42 is ON or OFF. If the 1RSW is ON, the flow advances to step S125, and the Mμ COM 15 checks the focus lock flag.

If the focus lock flag is "0", the Mμ COM 15 determines that the focus is not locked and performs focus adjustment in step S2μ. If the focus lock flag is "1", this means that the focus adjustment is already done. Therefore, the flow advances to step S126, and the Mμ COM 15 clears the focus lock flag to Thereafter, the flow advances to step S21.

The fourth embodiment of the present invention will be described below.

In the above first to third embodiments, the moving amount and direction of a principal object to be photographed from the center of an image plane are accurately calculated. However, the following method can also be used if it is only necessary to record an approximate position of a principal object to be photographed in an image plane.

Figure 18:
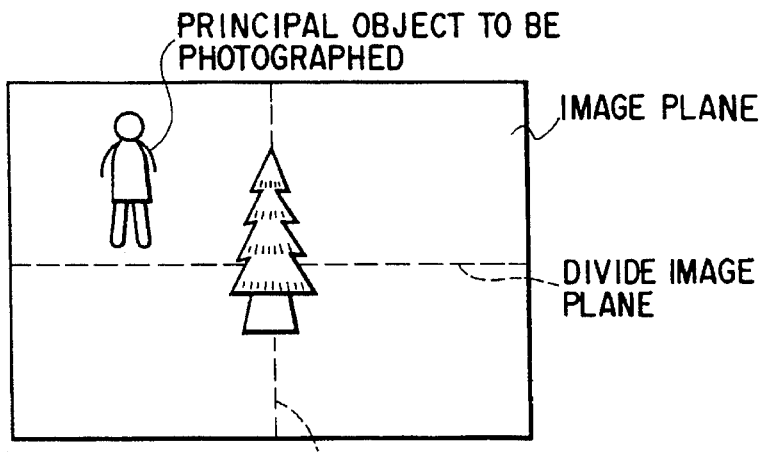
FIG. 18 is a view for explaining the fourth embodiment of the present invention, which illustrates the state in which an image plane is divided into four quadrants and a principal object to be photographed is present in the upper left quadrant of the image plane.

FIG. 18 shows the state in which an image plane is divided into four quadrants and a principal object to be photographed is present in the upper left quadrant of the image plane. In this fourth embodiment, a quadrant of an image plane in which a principal object is present is calculated and recorded.

Figure 19:
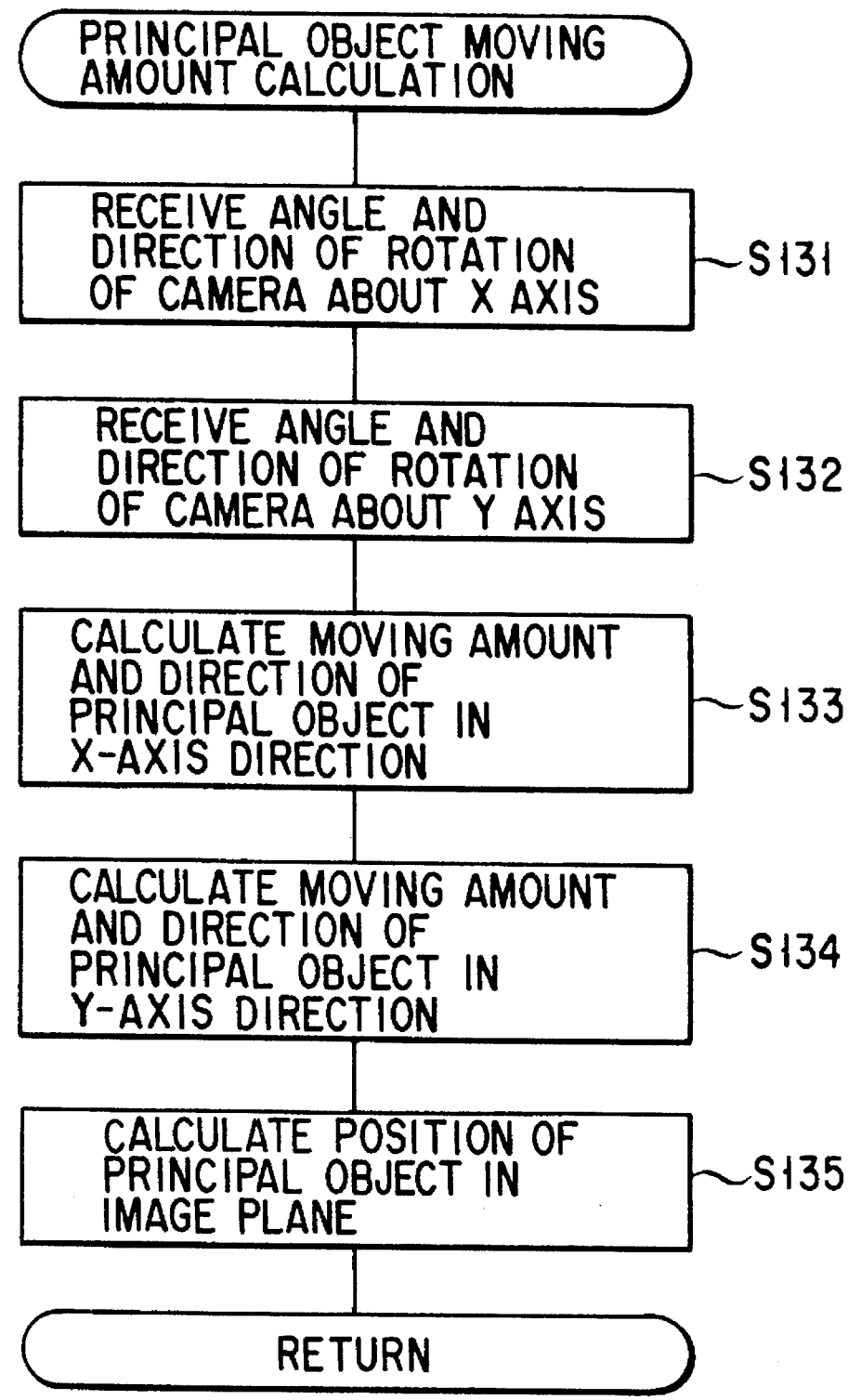
FIG. 19 is a flow chart for explaining the operation of a subroutine "principal object moving amount calculation" in the fourth embodiment of the present invention.

FIG. 19 is a flow chart of a subroutine "principal object moving amount calculation" in the fourth embodiment. The main routine of this fourth embodiment is identical to that shown in the flow charts of FIGS. 9A and 9B of the first embodiment described earlier except that the subroutine in steps S22 and S22' are replaced by the subroutine shown in FIG. 19. Therefore, only the subroutine in FIG. 19 as the different step will be described.

First, in steps S131 and S132, an Mμ COM 15 receives information on the angle and direction of rotation of a camera with respect to each of X and Y axes from an S1μ COM 45. In steps S133 and S134, the Mμ COM 15 calculates the moving amount and direction of a principal object to be photographed in an image plane in each of the X- and Y-axis directions.

Thereafter, in step S135, the Mμ COM 15 calculates an area of the image plane in which the principal object is present on the basis of the information on the moving amounts and directions of the principal object calculated in steps S131 to S134. When this calculation is completed, the flow returns to the main routine.

In this embodiment, in a blur preventing camera using a film capable of recording data, position information based on the moving amount of a principal object to be photographed in an image plane from focus lock to the ON operation of the 2RSW can be calculated by effectively using an expensive vibration sensor. By recording the position information based on the moving amount, together with luminance information, in an information recording portion of a film, printing can be performed while exposure is focused on the principal object.

The present invention can, of course, be modified without departing from the spirit and scope of the invention. For example, the vibration sensor is not restricted to an angular velocity sensor but can be any sensor as long as the sensor can calculate the rotational angle of a camera. Also, the integrating circuits can perform software processing in a digital manner, rather than in an analog manner. Furthermore, the recording means need not be a magnetic recording means but can be an optical recording means.

According to the present invention as has been described above, it is possible to provide a camera capable of recording position information of a principal object to be photographed, which corresponds to the moving amount of the principal object in an image plane, in an information recording portion of a film by using, e.g., a camera shake detecting means for detecting a camera shake, and to provide a method of recording the information.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A camera capable of loading a film having an information recording portion, the camera comprising:

a) focusing means for measuring a distance to a principal object to be photographed present in a focusing area of a photographic image plane and for determining a focal position of a taking lens on the basis of the measurement result;

b) output means for determining a position of the principal object in said photographic image plane in response to a change in a photographic field angle after said focusing means has determined the focal position, and for outputting principal object position information; and c) recording means for recording the principal object position information from said output means in the information recording portion of said film.

2. A camera according to claim 1, wherein said output means comprises:

a) rotational amount detecting means for detecting a rotational amount of said camera with the change in the photographic field angle;

b) focal length detecting means for detecting a focal length of said taking lens;

c) calculating means for calculating a moving amount of the principal object in said photographic image plane on the basis of the rotational amount detected by said rotational amount detecting means and the focus length detected by said focal length detecting means; and d) generating means for determining an area of said photographic image plane in which the principal object is present on the basis of the calculation result from said calculating means, and for generating the principal object position information.

3. A camera according to claim 2, wherein said rotational amount detecting means detects a vibration applied to said camera in a predetermined direction.

4. A camera according to claim 1, wherein the principal object position information specifies one of a plurality of areas of said photographic image plane.

5. A camera according to claim 1, further comprising:

generating means for generating luminance information of the principal object; and recording means for recording the principal object position information from said output means and the luminance information from said generating means in the information recording portion of said film.

6. An information recording method of a camera having detecting means for detecting a rotational angle of said camera and recording means for recording information on a film, comprising the steps of:

a) generating an operation start signal in response to a first operation performed by a user;

b) starting an integral action for an output from said detecting means in response to the operation start signal;

c) generating an operation end signal in response to a second operation performed by the user during the integral action;

d) stopping the integral action in response to the operation end signal;

e) converting a signal obtained by the integral action into recording information to be recorded on said film; and f) recording the recording information on said film.

7. A camera comprising:

a) displacement angle defecting means for detecting a displacement angle of a principal object to be photographed, which is present in a photographic image plane, from a center of said photographic image plane, said displacement angle being obtained on the basis of an output signal from angular velocity detecting means provided in said camera; and b) data recording means for recording data based on the displacement angle detected by said displacement angle detecting means on a film as a displacement of the principal object from the center of said photographic image plane.

8. A camera according to claim 7, wherein said data recording means includes means for magnetically recording the data on said film.

9. A camera according to claim 7, further comprising:

a taking lens capable of zooming; and detecting means for detecting a focal length of said taking lens, and wherein said data recording means records a product of the displacement angle of the principal object from the center of said photographic image plane and the focal length of said taking lens detected by said detecting means as the displacement of the principal object from the center of said photographic image plane.

10. A camera comprising:

a) photometric means for measuring luminance of a portion of a photographic image plane;

b) rotational amount detecting means for detecting a rotational amount of a photographic optical axis;

c) displacement detecting means for detecting a displacement of a principal object to be photographed, which is present in said photographic image plane, from a center of said photographic image plane, based on an output from said rotational amount detecting means; and d) data recording means for recording data, based on outputs from said photometric means and said displacement detecting means, on a film.

11. A camera according to claim 10, wherein the data recorded on said film includes print exposure correction data used when an image in said photographic image plane is printed.

12. A camera capable of recording data on a film, the camera comprising:

a) focusing means for focusing an object to be photographed present in a focusing area provided in a center of an image plane of a viewfinder;

b) focus lock means for allowing exposure even if a principal object to be photographed is present outside said focusing area;

c) rotational amount detecting means for detecting a rotational amount of a photographic optical axis; and d) focal length output means for outputting a focal length of a taking lens, wherein an operation of said rotational amount detecting means is started when said focus lock means is operated and stopped when an exposure start signal is input, thereby obtaining a rotational angle of the principal object from the center of said image plane, and a product of the rotational angle and the focal length of said taking lens is recorded on said film as data about a displacement of the principal object from the center of said image plane.

13. An automatic focusing camera including a focusing area in a center of an image plane of a viewfinder and capable of performing focus lock, the camera comprising:

a) data recording means for recording data on a film;

b) rotational amount detecting means for detecting a rotational amount of a photographic optical axis; and c) focal length detecting means for detecting a focal length of a taking lens, wherein an operation of said rotational amount detecting means is started when the focus lock is performed and stopped when an exposure start signal is input, thereby obtaining a rotational angle of a principal object to be photographed from the center of said image plane, and a product of the rotational angle and the focal length of said taking lens is recorded on said film as data about a displacement of the principal object from the center of said image plane.

14. A camera according to claim 13, further comprising spot photometric means for measuring an object luminance within a narrow range near said focusing area, so that spot photometric data of the principal object is also obtained in the focus lock and added to the data to be recorded on said film.

15. An automatic focusing camera capable of using a film capable of recording data, the camera comprising:
  a) focusing means for focusing a principal object to be photographed present in a focusing area provided in a center of an image plane of a viewfinder;
  b) first means for allowing exposure even if the principal object is present outside said focusing area;
  c) second means for designating a start of the exposure;
  d) focal length output means for outputting a focal length of a taking lens;
  e) rotational angle detecting means for detecting a rotational angle of a photographic optical axis from an operation of said first means to an operation of said second means; and
  f) recording means for recording a product of the focal length from said focal length output means and the rotational angle from said rotational angle detecting means on said film as a moving amount of the principal object from the center of said image plane.

16. A data recording method for an automatic focusing camera capable of using a film capable of recording data, the method comprising:
  a) a first step of determining focusing data of a taking lens with a principal object to be photographed present in a center of a photographic image plane, and holding the focusing data;
  b) a second step of designating a start of exposure to said film with the principal object present outside the center of said photographic image plane; and
  c) a third step of detecting a rotational angle of a photographic optical axis occurring from the first step to the second step, and recording a product of a focal length of said taking lens and the rotational angle as data on said film.

17. An information recording apparatus of a camera having detecting means for detecting a rotational angle of said camera and recording means for recording information on a film, the information recording apparatus comprising:
  a) first generating means for generating an operation start signal in response to a first operation performed by a user;
  b) starting means for starting an integral action for an output from said detecting means in response to the operation start signal from said first generating means;
  c) second generating means for generating an operation end signal in response to a second operation performed by the user during the integral action;
  d) stopping means for stopping the integral action of said starting means in response to the operation end signal from said second generating means;
  e) converting means for converting a signal obtained by the integral action of said starting means into recording information to be recorded on said film; and
  f) recording means for recording the recording information from said converting means on said film.

\* \* \* \* \*